US010362340B2

(12) United States Patent
Ramadorai et al.

(10) Patent No.: US 10,362,340 B2
(45) Date of Patent: Jul. 23, 2019

(54) TECHNIQUES FOR CREATION OF AUTO-MONTAGES FOR MEDIA CONTENT

(71) Applicant: Burst, Inc., Boston, MA (US)

(72) Inventors: Jayachandran Ramadorai, Newton, MA (US); Aditya Chaganti, Boston, MA (US); Mark Kurtz, Medford, MA (US); Smitha Gopu, Hyderabad (IN)

(73) Assignee: Burst, Inc., Boston, MA (US)

( * ) Notice: Subject to any disclaimer, the term of this patent is extended or adjusted under 35 U.S.C. 154(b) by 0 days.

(21) Appl. No.: 15/947,310

(22) Filed: Apr. 6, 2018

(65) Prior Publication Data

US 2018/0295396 A1 Oct. 11, 2018

(30) Foreign Application Priority Data

Apr. 6, 2017 (IN) .............................. 201741012390

(51) Int. Cl.
| | |
|---|---|
| *H04N 5/93* | (2006.01) |
| *H04N 21/234* | (2011.01) |
| *G06F 9/50* | (2006.01) |
| *H04N 21/2743* | (2011.01) |
| *H04N 21/8549* | (2011.01) |
| *G11B 27/031* | (2006.01) |
| *H04N 21/84* | (2011.01) |
| *G06Q 50/00* | (2012.01) |

(52) U.S. Cl.
CPC ..... *H04N 21/23424* (2013.01); *G06F 9/5077* (2013.01); *G11B 27/031* (2013.01); *H04N 21/23418* (2013.01); *H04N 21/2743* (2013.01); *H04N 21/84* (2013.01); *H04N 21/8549* (2013.01); *G06Q 50/01* (2013.01)

(58) Field of Classification Search
CPC ............. H04N 21/23424; H04N 21/84; H04N 21/8549; H04N 21/23418; H04N 21/2743; G06F 9/5077; G11B 27/031; G06Q 50/01
USPC .......................... 386/290, 278, 281, 282, 326
See application file for complete search history.

(56) References Cited

U.S. PATENT DOCUMENTS

| | | | |
|---|---|---|---|
| 6,353,461 B1 | 3/2002 | Shore et al. | |
| 8,244,103 B1 | 8/2012 | Shore | |
| 8,520,072 B1 | 8/2013 | Slavin et al. | |
| 9,313,556 B1 | 4/2016 | Borel et al. | |
| 2002/0106191 A1 | 8/2002 | Betz et al. | |
| 2006/0117356 A1 | 6/2006 | Jojic et al. | |
| 2006/0268121 A1 | 11/2006 | Watanabe | |
| 2007/0263984 A1* | 11/2007 | Sterner | G11B 27/034 386/234 |
| 2008/0112684 A1 | 5/2008 | Matsushita et al. | |
| 2009/0041356 A1 | 2/2009 | Barbieri et al. | |

(Continued)

*Primary Examiner* — Robert Chevalier
(74) *Attorney, Agent, or Firm* — Kilpatrick Townsend & Stockton, LLP

(57) ABSTRACT

In one embodiment, a montage of media (videos, images, audio, etc.) is created automatically from media submitted by different users and related to a common theme or event. A bubble is created for each theme or event. The users submit the media over the Internet or another network with an indication of a particular bubble the media pertains to. The media in the bubble is examined for objects, audio, engagement metrics, faces, and various other accompanying markers, which are then used to identify media or fragments of media for inclusion in an automatic montage, with music and transition effects.

20 Claims, 20 Drawing Sheets

(56) References Cited

U.S. PATENT DOCUMENTS

| | | |
|---|---|---|
| 2012/0201519 A1 | 8/2012 | Reynolds et al. |
| 2013/0077937 A1 | 3/2013 | Kennedy et al. |
| 2013/0300933 A1 | 11/2013 | Thorson |
| 2014/0037269 A1 | 2/2014 | Kumar et al. |
| 2015/0147045 A1 | 5/2015 | Bimkrant |
| 2015/0296187 A1 | 10/2015 | Baldwin |
| 2015/0318020 A1* | 11/2015 | Pribula ............ H04N 21/43615 386/227 |
| 2015/0350611 A1 | 12/2015 | Pearson et al. |
| 2015/0382083 A1 | 12/2015 | Chen et al. |
| 2016/0286128 A1 | 9/2016 | Zhou |
| 2016/0358629 A1 | 12/2016 | Pribula |

\* cited by examiner

TECHNIQUES FOR CREATION OF AUTO-MONTAGES FOR MEDIA CONTENT

CLAIM OF PRIORITY AND INCORPORATION BY REFERENCE

The present application is a U.S. Non-Provisional patent application that claims priority and benefit from India Provisional Patent Application No. 201741012390, filed in India on Apr. 6, 2017 and entitled "TECHNIQUES FOR CREATION OF AUTO-MONTAGES FOR MEDIA CONTENT," the entire contents of which is incorporated herein by reference for all purposes.

BACKGROUND

The present disclosure relates generally to providing automated video montages or summaries from user generated content.

Videos captured by a user's camera can be difficult to manage. Systems exist for analyzing videos and identifying certain portions of the videos. The identified portions of the videos can then be assembled into an edited video. One simple example is providing a summary of videos from a security camera that only includes portions with significant motion. Those portions with significant motion can be further tagged manually by the user, or image recognition can identify portions with faces, or other objects, requiring a lot of processing.

In one type of system, authoring tools are provided for a curator to manually view and mark particular videos for inclusion in a montage. An example is US Pub. No. 2002/0106191 "SYSTEMS AND METHODS FOR CREATING A VIDEO MONTAGE FROM TITLES ON A DIGITAL VIDEO DISK." US Pub. No. 2016/0358629 "INTERACTIVE REAL-TIME VIDEO EDITOR AND RECORDER" describes "[v]ideo metadata collected with the video management system can also be used to facilitate interactions on scalable crowd-sourced social video-editing platforms. For example, any video montage created with the video management system could be modified and used as a video template." This system describes using metadata to modify the video, such as replacing detected music with a better quality recording.

In US Pub. No. 20150147045 "COMPUTER ECOSYSTEM WITH AUTOMATICALLY CURATED VIDEO MONTAGE," a user "can specify parameters for a video montage that leverages the metadata for automatic video montage creation based on the metadata." (Abstract). As described, the user uploads video to a cloud service. "A cloud based algorithm may automatically view each frame of a video and automatically generate searchable tags that can be used for video creation. These tags can include facial recognition, geo-tagging, time tagging, object recognition, etc. The tagging can include searches of social networks, calendar information, emails, etc. to provide an even higher level of context. In addition, the video stream and audio stream can be further analyzed for indications of excitement, emotion, etc. lending itself to highlight generation." (Paragraph [0006]). The system allows a user to upload all the photos and videos on a smartphone and specify an algorithm for a particular theme montage.

It would be desirable to provide a montage of videos from different users, with automatic selection of particular portions of videos, without requiring excessive processing.

BRIEF SUMMARY

In one embodiment, a montage of media (videos, images, audio, etc.) (also referred to herein as "media content") is created automatically from media submitted by different users and related to a common theme or event. A data store, or a "bubble" is created for each theme or event. A bubble can be a virtual container of media content pertaining to one or more events or topics of interest. A bubble can be accessible in a cloud system, via one or more communication networks. Users can submit the media over the Internet or another network with an indication of a particular bubble the media pertains to. The media in the bubble is examined for accompanying markers, which are used to identify media or fragments of media for inclusion in a montage.

In one embodiment, the media and fragments are organized in the montage in chronological order using timestamps associated with the media. Different markers are assigned different weights, and the weighted marker values are combined to produce a media score.

Media with the highest score are included in the montage. The markers can be provided by users, thus not requiring processing to generate them. Markers can include a WOW marker indicating that a user thinks the media is good, an effects marker indicating that a user has applied effects, a thumbnail marker where a user extracted a thumbnail, an audio marker indicating audio in a video. If audio is present, it may be examined for speech, music, singing and applause. These different types of audio may be weighted differently, and may indicate fragments of the video to include.

In one embodiment, a bubble is created for a particular event, subject, etc. A uniform resource locator (URL) or other reference address (e.g., a pointer) to the bubble is made public for use by users, such as by posting on a website, in a tweet, in a widget, etc. A client application is downloaded by users and used to apply markers to the video. The client application can then upload the media to the bubble using the URL. The server can create a montage using the markers and timestamps (embedded upon original capture of the user media), thus eliminating the need to process and evaluate the content of the media.

In one embodiment, the montage is created without extensive analysis of video content. By relying on markers applied by a user, no processing or additional human curating is needed to determine which media and fragments to include in a montage. For example, users can apply WOW markers, effects and thumbnails. Audio can be detected and analyzed with less processing power than video. Compressed video can also be analyzed, without decompressing. Common compression uses periodic key frames, and subsequent frames are represented by differences from the key frame. The key frames can be examined without first reconstituting (decompressing) the other frames. The key frames can be examined for particular objects (e.g., humans, animals, signs, etc.) or conditions or actions (e.g., raining, nighttime, dancing, etc.). Certain markers may include a range, with start and stop points, such as a WOW range marker. The indicated range is included in the montage. Other markers do not have a range, and a plurality of seconds (2-5 seconds) of content before and after the marker are included. Where there are no markers, and there is still room within the maximum montage length limit, the first few seconds (e.g., 5-10 seconds) of a video is included.

In one embodiment, clusters of like videos are created. This can facilitate subgroups of the bubble theme or event and elimination of duplicate media. Time stamps are compared to provide a chronological grouping. Markers and metadata for the media are compared for matching words (and synonyms). The media are then grouped into clusters based on the matches. To avoid duplicates, only the media with the highest score might be selected from each cluster for inclusion in the montage.

In one embodiment, in bubbles that have been enabled for public viewing, only media that are approved for display are considered for inclusion in the montage. In a further refinement, if a media is rejected after it as first included in the montage, the next auto-update of the montage will exclude that media item.

Some embodiments disclosed herein may be implemented by a computer system that is configured to implement methods and operations disclosed herein. Yet some embodiments relate to systems, computer products, and machine-readable tangible storage media, which employ or store instructions for methods and operations disclosed herein. In at least one embodiment, systems may include one or more processors and memory. The memory may store instructions that are executable by the one or more processors to perform methods and operations disclosed herein. Systems may include a computer product, machine-readable tangible storage media, modules, or a combination thereof to perform methods and operations disclosed herein.

DETAILED DESCRIPTION

Figure 1:
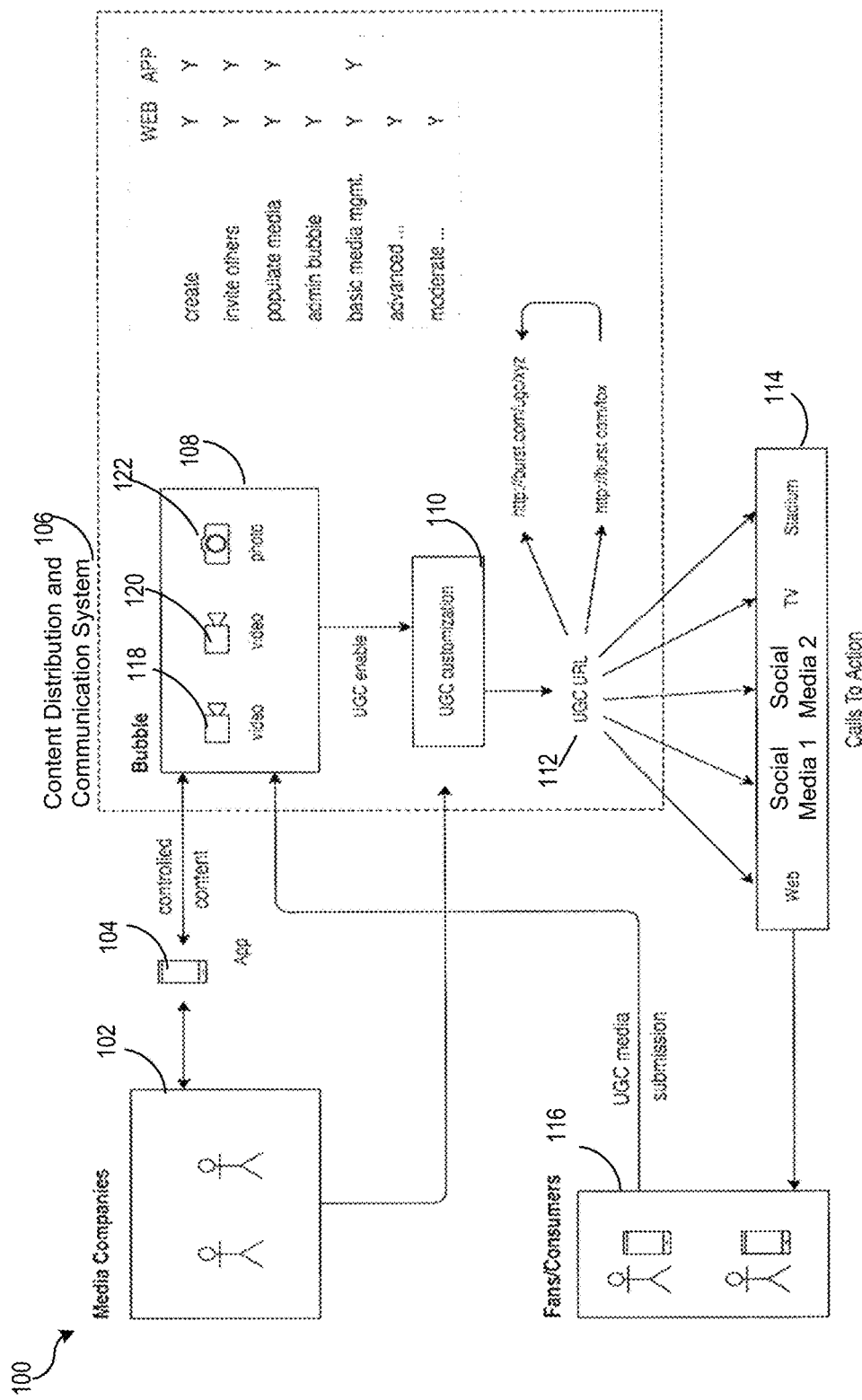
FIG. 1 shows a block diagram of a user generated content (UGC) submission system according to an embodiment.

In the following description, for the purposes of explanation, specific details are set forth in order to provide a thorough understanding of embodiments of the present disclosure.

However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

The some embodiments, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some embodiments, the processes depicted in sequence diagrams and flowcharts herein can be implemented by any of the systems disclosed herein. The particular series of processing steps in this disclosure are not intended to be limiting. Other sequences of steps may also be performed according to alternative embodiments. For example, alternative embodiments of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In an aspect of some embodiments, each process in this figures of this disclosure can be performed by one or more processing units. A processing unit may include one or more processors, including single core or multicore processors, one or more cores of processors, or combinations thereof. In some embodiments, a processing unit can include one or more special purpose co-processors such as graphics processors, digital signal processors (DSPs), or the like. In some embodiments, some or all of processing units can be implemented using customized circuits, such as application specific integrated circuits (ASICs), or field programmable gate arrays (FPGAs).

I. Architecture of Content Distribution and Communication System

FIG. 1 shows a block diagram of a system 100 for enabling a user to provide media content, such as user generated content (UGC), to a broadcast system according to an embodiment of the present disclosure.

Media content (also referred herein as "media") may be represented by data (e.g., also referred to herein as content data) in an electronic form (e.g., electronic media content). Media content may include one or more types of content, including, but not limited to, a file, an image, a video, audio, other electronic media content, or combinations thereof. Content data for media content may be unstructured, structured, or a combination thereof. Media content may be defined based on one or more formats. Media content may be defined as having a format using, without limitation, hypertext markup language (HTML), cascade style sheets (CSS), JavaScript, or other formatting techniques and languages. A format may indicate a style for presenting media content. Media content may be presented in a manner, which the media content can be perceived by a user. In some embodiments, metadata may indicate information (e.g., an attribute) about or associated with media content. Some media content may be generated or created by a user (e.g., a consumer). Such media content may be referred to as "user generated content" (UGC) or "user created content" (UCC).

A broadcast system 102 may broadcast media content to users. The broadcast system may be managed by one or more media companies or other entity. A broadcast system may be implemented by one or more computer systems. Broadcast system 102 may provide a destination where content can be provided for incorporation into a broadcast by broadcast system 102.

A broadcast system may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

Content system 106 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

Broadcast system 102 may communicate with one or more clients systems 104 (referred to herein as "client system" or "client"). Broadcast system 102 may communicate with a content distribution and communication system 106 (also referred to herein as a "content system"). Broadcast system may communicate with media system through one or more client systems. Client systems may include devices 116 operated by users (e.g., fans and/or consumers). Consumers may generate UGC for submission to content system 106. A client system may be a device or an application (also referred to herein as an "app") operating on a device. Client system 104 may be a user-operated computing device that may be implemented using hardware, firmware, software, or combinations thereof to interact with content system 106. For example, client system 104 may be a client device, including, without limitation, a desktop computer, a laptop computer, a tablet computer, a smart phone, a wearable computing device, a personal digital assistant, and so on. Client system 104 may be a device implemented as an iPhone provided by Apple Corporation, an Android-based device, or other mobile communication device.

An application may be stored and executed locally on a client system. In some embodiments, all or part of an application may be hosted and executed remotely on a computing system, e.g., content system 106, accessible to a client system. An application may be implemented as a client app executing on an operating system of a client system, a web browser that interfaces with a web based messaging service, a service-specific application provided by content system 106, or another app. For example, an application may be implemented by content system 106 and accessed from a client system, a broadcast system or combinations thereof. In some embodiments, an application may be provided as a service by content system 106.

Content system 106 may be implemented using a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. The computing system that makes up content system 106 may run any of operating systems or a variety of additional server applications and/or mid-tier applications, including HTTP servers, FTP servers, CGI servers, Java servers, database servers, and the like. Exemplary database servers include without limitation those commercially available from Microsoft, and the like. In one example, content system 106 may be included in or implemented in a product (e.g., BurstOnTV) provided by Burst, Inc. In various embodiments, content system 106 may be configured to run one or more services or software applications described in the foregoing disclosure. For example, content system 106 may correspond to a computing system for performing processing as described herein according to an embodiment of the present disclosure.

In some embodiments, content system 106 may be implemented as an enterprise computing system or a cloud computing system comprising one or more computers and/or servers that may include those described above. Content system 106 may include several subsystems and/or modules, including some, which may not be shown. Content system 106 may have more or fewer subsystems and/or modules than shown in the figure, may combine two or more subsystems and/or modules, or may have a different configuration or arrangement of subsystems and/or modules. Subsystems and modules of content system 106 may be implemented in software (e.g., program code, instructions executable by a processor), firmware, hardware, or combinations thereof. In some embodiments, the software may be stored in a memory (e.g., a non-transitory computer-readable medium), on a memory device, or some other physical memory and may be executed by one or more processing units (e.g., one or more processors, one or more processor cores, one or more GPUs, etc.).

In certain embodiments, content system 106 may also provide other services or software applications can include non-virtual and virtual environments. For example, content system 106 may be implemented as a cloud-based system which operates as a cloud by communicating with client systems and broadcast systems using one or more communication networks (e.g., the Internet). In some embodiments, these services may be offered as web based or cloud services or under Software as a Service (SaaS) model to the users of broadcast systems and client systems. The services and/or applications may be provided via a communication network, such as the Internet. The services offered by content system 106 may include application services. Content system 106 may be accessed using one or more applications to utilize the services or applications provided by content system 106. Application services may be provided by content system 106 via a SaaS platform. The SaaS platform may be configured to provide services that fall under the SaaS category. The SaaS platform may manage and control the underlying software and infrastructure for providing the SaaS services. By utilizing the services provided by the SaaS platform, customers can utilize applications executing in content system 106, which may be implemented as a cloud infrastructure system. Users can acquire the application services without the need for customers to purchase separate licenses and support. Various different SaaS services may be provided.

Users operating client system 104 may in turn utilize one or more applications to interact with content system 106 to utilize the services provided by subsystems and/or modules of content system 106. Services may be offered as a self-service or a subscription. In some embodiments, a specific instantiation of a service provided by content system 106 may be referred to herein as a "service." A service made available to a user via network (e.g., a communication network) from content system 106 is referred to as a "cloud service." In some embodiments, content system 106 may host an application, and a user may, via a network, access the application at on demand. For example, a user operating a client system 104 may facilitate communication between broadcast system 102 and content system 106.

Content system 106 may include at least one memory, one or more processing units (or processor(s)), and storage. The processing unit(s) may be implemented as appropriate in hardware, computer-executable instructions, firmware, or combinations thereof. Computer-executable instructions or firmware implementations of the processing unit(s) may include computer-executable or machine-executable instructions written in any suitable programming language to perform the various operations, functions, methods, and/or processes described herein. The memory in content system 106 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protect a computer from an electronic communication containing malicious code. The computer-readable storage media may include instructions stored thereon, that when executed on a processor, perform the operations described herein.

Communication between elements in system 100 may be facilitated using one or more communication networks of various types. Examples of communication networks include, without restriction, the Internet, a wide area network (WAN), a local arear network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols. In some embodiments, communication may be facilitated using one or more messaging services. Examples of messaging services may include email services such as Gmail™ (a service of Google Inc.) and Yahoo!® Mail (a service of Yahoo! Inc.). Other examples may include instant messaging or chat services such as Gmail's chat feature or Facebook's chat (a service of Facebook, Inc.), a short message service (SMS) and/or a multimedia messaging service (MMS) provided by cellular data carriers, social network services with a messaging component (e.g., social networks provided by Facebook, Inc., or LinkedIn Corp.).

A "message" may include any electronic communication generated by a sender and directed to one or more recipients, such as email messages, instant messages (e.g., messages sent between users using various "chat" services), SMS/MMS messages (e.g., messages conforming to SMS and/or MMS protocols supported by various cellular and other wireless data networks), voice messages, photo/image messages, social network messages, and so on. In some embodiments, communication may be facilitated using a push notification system implemented by a push notification service (e.g., Apple push notification service provided by the Apple® corporation or Google notification service provided by the Google® corporation).

Content system 106 may provide an interface (e.g., a graphical interface) to access features of content system 106. The interface may be provided as an application or a service. An interface may enable a user to create one or more data storage structures, such as a data storage container 108 (also referred to herein as a "bubble"), to store media content, such as UGC. The bubble 108 may be implemented using software, hardware, firmware, or combinations thereof for receiving and storing media. A bubble may be implemented using one or more data stores.

Any of the data stores (or data storage systems) disclosed herein may be implemented using any type of persistent storage device, such as a memory storage device or other non-transitory computer-readable storage media. In some embodiments, local storage may include or implement one or more databases (e.g., a document database, a relational database, or other type of database), one or more file stores, one or more file systems, or combinations thereof. Memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

The content in a bubble may be associated with a broadcast of media content. A bubble may be created by media companies and fans/consumers. A bubble may be created to store UGC having one or more attributes, such as a particular event, a theme, a location, a time, a broadcast, etc. A bubble may be created for access through a web based interface and/or an application. A user (e.g., an administrator of content) may manage content in a bubble. One or more management attributes may be configured for a bubble. For example, management attributes may include, without limitation, creating, reading, updating, deleting, inviting others, populating media, administration, media management, advanced functions, moderate functions, or other media use and management functions.

Upon creation of a bubble 108 and enabling reception of UGC, a bubble can be customized by content system 106. Content system 106 may include a customization module 110 which can configure and/or customize a bubble. Customization module 110 may generate a unique address or location, such as a uniform resource locator (URL) 112. A URL can be randomly generated, or can be a vanity URL with the name of the sponsor, for example. The URL can then be advertised to fans/consumers via various media channels 114, such as on a web page, social media channels (e.g., Facebook®, or Twitter®), TV or a Stadium big screen.

Users (e.g., fans, consumers, and/or viewers) can operate their devices 116 to obtain media content (e.g., videos, photos, audio recordings, graphics and other media) and upload the media content to bubble 108 using the URL 112. Bubble 108 can store media content, such as multiple videos 118, 120 and photos 122 along with other media. Multiple bubbles can be used. These uploads are optimized for the connectivity conditions and the quality levels of the media to ensure successful uploads with the least detriment to media quality.

Figure 2:
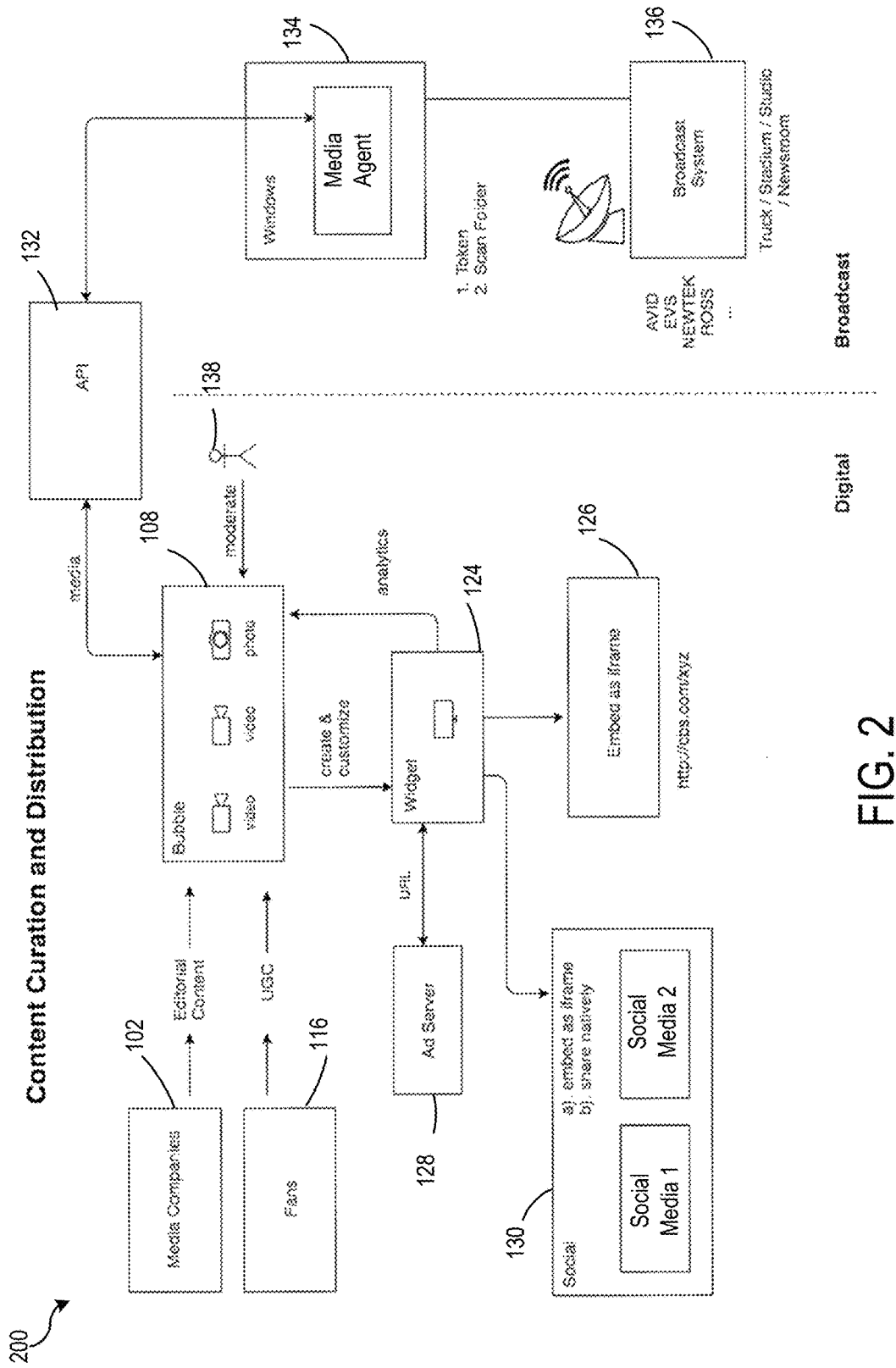
FIG. 2 is a block diagram illustrating content curation and distribution according to an embodiment.

FIG. 2 is a block diagram illustrating a system 200 for content curation and distribution according to an embodiment. System 200 may be implemented using all or some of elements of FIG. 1, such as content system 106. Both UGC from devices 116 of fans and editorial content from broadcast systems 102 of media companies can be provided to one or more bubbles (e.g., bubble 108) at content system 106. The media content in bubble 108 can then be approved and curated by one or more mediators 138. Derivative or modified media can be created and customized using an application (e.g., a widget 124) accessible through content system 106. The widget can provide the derivative media to a variety of media destinations, such as media distribution channels using an iframe 126) for embedding in a website or a native app, an ad server 128 for providing to other websites and distribution channels, and social media sites 130, such as Facebook® or Twitter®. Alternately, the media content can be provided through a programming interface (e.g., an API 132) to a Windows, Mac OS X, Linux or other platform 134 for use by a broadcast system 136 (e.g., broadcast system 102). Platform 134 may be implemented by an entity that is different from a company associated with broadcast system 136. For example, the entity may be a production company that provides services to a broadcast system. Platform 134 may be implemented using one or more computer systems, such as any of those described for a broadcast system. Platform 134 may be implemented with programming code (e.g., an application), such as a media agent, configured for communication with content system 106 and broadcast system 136.

The broadcast system 136 may be a truck, a stadium control room, a media production studio or a newsroom, for example. The API 132 provides the media content to a broadcast format customized for the particular broadcast system 136. The media content may be converted from a digital format (e.g., an Internet-based format) to the broadcast format.

Figure 3:
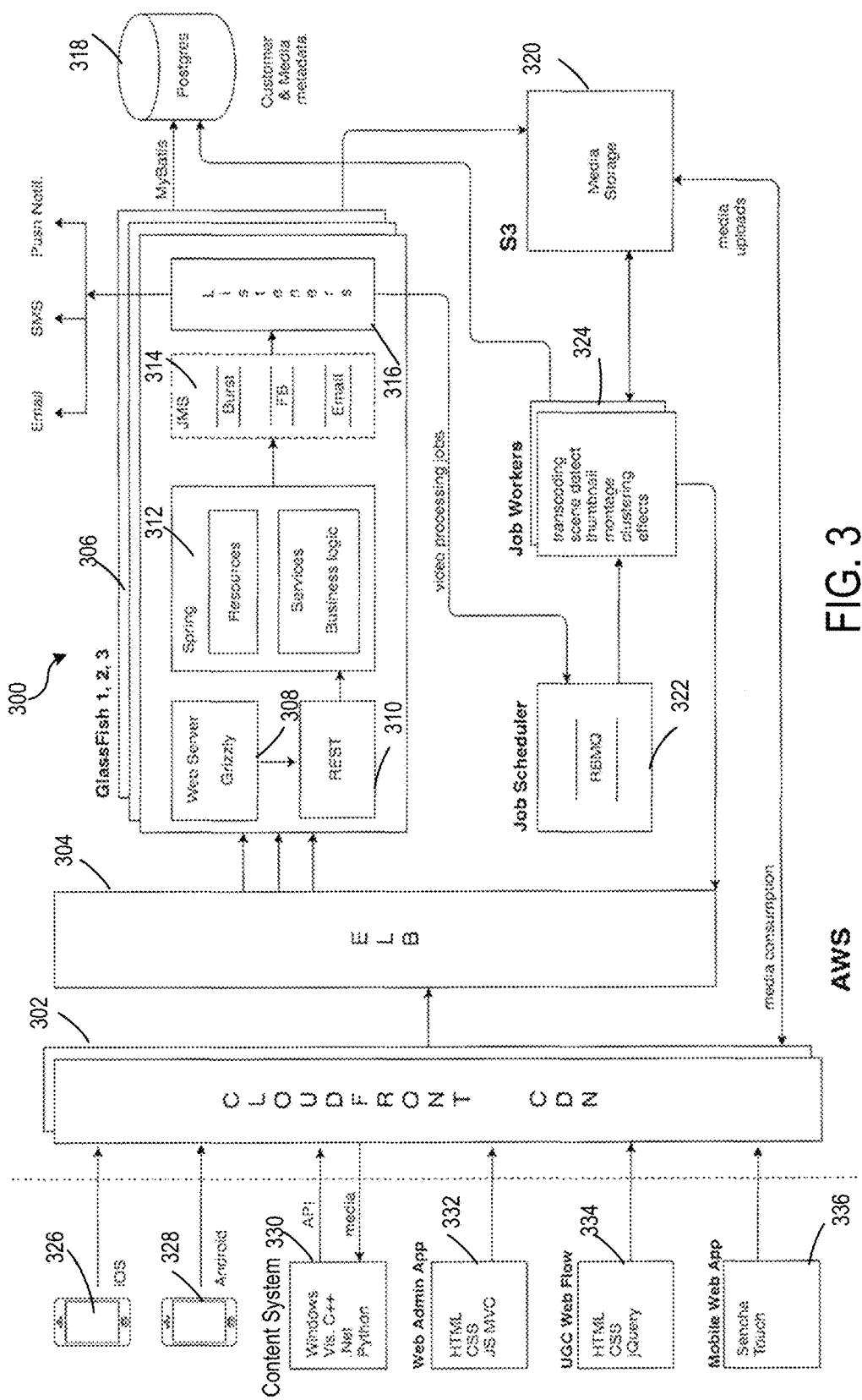
FIG. 3 is a block diagram illustrating a bubble and widget architecture according to an embodiment.

FIG. 3 is a block diagram illustrating a system 300 including a bubble and widget architecture according to an embodiment. System 300 may be implemented in or with system 100. Bubble 108 and widget 124 of FIG. 2 may be implemented as shown in FIG. 3. A programming interface, such as interface 302 may be implemented using one or more computer systems, such as an edge service. Interface 302 may be implemented as a cloud-based CDN (Content Delivery Network) to receive and send data. An example of a CDN may be a Cloudfront CDN provided by Amazon Web Services. Interface 302 may be implemented as part of content system 106.

System 300 may include one or more load balancers, such as an ELB (Elastic Load Balancer) 304. ELB 304 can route API calls to a cluster of server systems 306, such as one or more server computers implemented using GlassFish open source. ELB 304 may be implemented in content system 106. System 300 may include a web server 308, such as a Grizzly server, provides web based services (e.g., HTTP services) and multiple thread management. Server 308 uses a REST (Representational State Transfer) service 310—an architectural style for networked hypermedia applications used to build Web services that are lightweight, maintainable, and scalable.

System 300 may include an interface 312, such as a Spring interface, provides a common interface for diverse resources, such as transaction management, authentication and session control. Interface 312 communicates with a Java Message Service (JMS) 314, which can enable asynchronous processing for various actions such as sending messages through email, SMS and push notifications. An event listener 316 detects events, and can push them out and store them in a database 318, such as an open source Postgres database or deliver them to other external systems. The database 318 also stores all meta data, consumer information and all the data necessary to process, curate and distribute the media.

A media storage database 320 can store the media received through various bubbles. A job scheduler 322 schedules jobs for job workers 324, which handle various processing functions such as transcoding, scene detection, thumbnail detection, montage creation, clustering and applying effects to media.

Each of the elements 302-324 can be implemented in or with content system 106.

Interface 302 can be an edge server that interfaces with various input and output applications, such as user mobile devices 326 and 328, a content system 330 (e.g., a system for BurstOnTV provided by Burst, Inc.), a web administrator application 332, a UGC (User Generated Content) web flow application 334 and a mobile web application 336.

Figure 4:
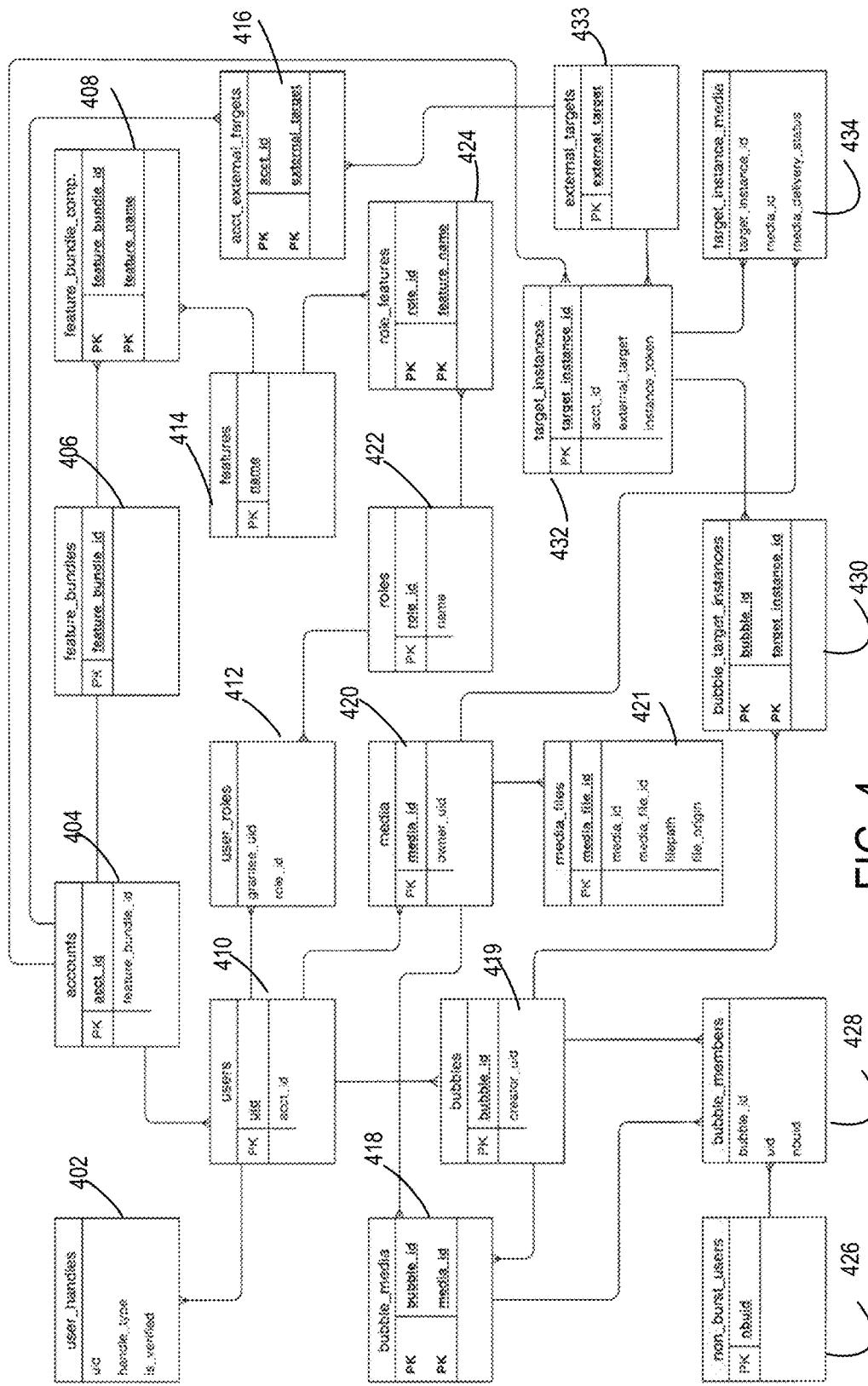
FIG. 4 is a diagram of a subset of data structures implemented in an embodiment.

FIG. 4 is a diagram of a subset of data structures as implemented in an embodiment. The total set of tables can be hundreds of tables or more. User_handles 402 identify particular users, with each user having a user ID 410 and user_roles 412 selected from roles 422 which have role_features 424. Accounts 404 identify particular customer accounts. Feature bundles 406 provide combinations of features 414 as specified in feature_bundle_components. 408. Bubble_media 418 identifies which media 420 are in which bubbles. Media_files 421 can tracks each media file associated with each item of media content, such as thumbnail files of various sizes, and video files of different quality levels and resolutions generated via transcoding from a single original user submitted media file. Bubbles 419 can be associated with bubble members 428, to indicate who are direct invitees to a bubble, which can include non-registered-users 426 or registered users 410.

External_targets 433 are the broadcast and production systems to which media can be delivered. Target_instances 432 are the individual instances of such external targets. Thus, each target instance is a truck or a studio or a stadium control room running the broadcast system specified by the associated external target. Bubble target_instances 430 relate one or more bubbles to one or more target instances. There is a one-to-many relationship in both directions. Thus, one bubble can feed many trucks and many studios, and one truck or studio can be fed by many different bubbles. Acct_external_target 416 indicates which external systems each account in accounts 404 is provisioned for. For example, an account may be provisioned for EVS, and certain target instances also known as destinations (trucks or studios) of an account may be provisioned for EVS. Target_instance_media 434 keeps track of every destination to which media has been sent, and what is the status assigned to the media, such as downloaded, ingested, failed, etc. External targets of accounts 416 are selected from external targets 433. Target_instances 432 link to target_instance_media 434 and bubble_target_instances 430.

Each piece of media content can have many files associated with the original file the user sends. Those files include all of the transcoder variations of the files including thumbnails of various different shapes and the streams for the media. The media files themselves are stored, in one embodiment, on a storage service such as Amazon S3. The database tables reference the actual media locations on Amazon S3. The customer and media metadata are stored in the tables rather than in Amazon S3 in one embodiment.

II. Interfaces for Content Distribution and Communication System

FIGS. 5-13 illustrate interfaces according to some embodiments. Each of the interfaces may be displayed at a device or a computer system. For example, an interface may be presented at a client system, a broadcast system, or combinations thereof. Interfaces may include an interface, such as a physical interface, a graphical interface (e.g., a graphical user interface), or a combination thereof. A graphical interface may be generated by a device and/or received from content system 106, or a combination thereof. An interface may be updated, modified, enhanced, and regenerated, without restriction, in response to one or more events (e.g., an interaction with the graphical interface). Examples of graphical interfaces are disclosed herein with reference to the figures. The graphical interface(s) enable functionality disclosed herein, such as functionality of content system 106. A graphical interface may be provided by content system 106 via a network as part of a service (e.g., a cloud service or a web based service) or application. In some embodiments, a device may provide access to one or more applications. An application may enable a user to access and perform services provided by content system 106.

Figure 5:
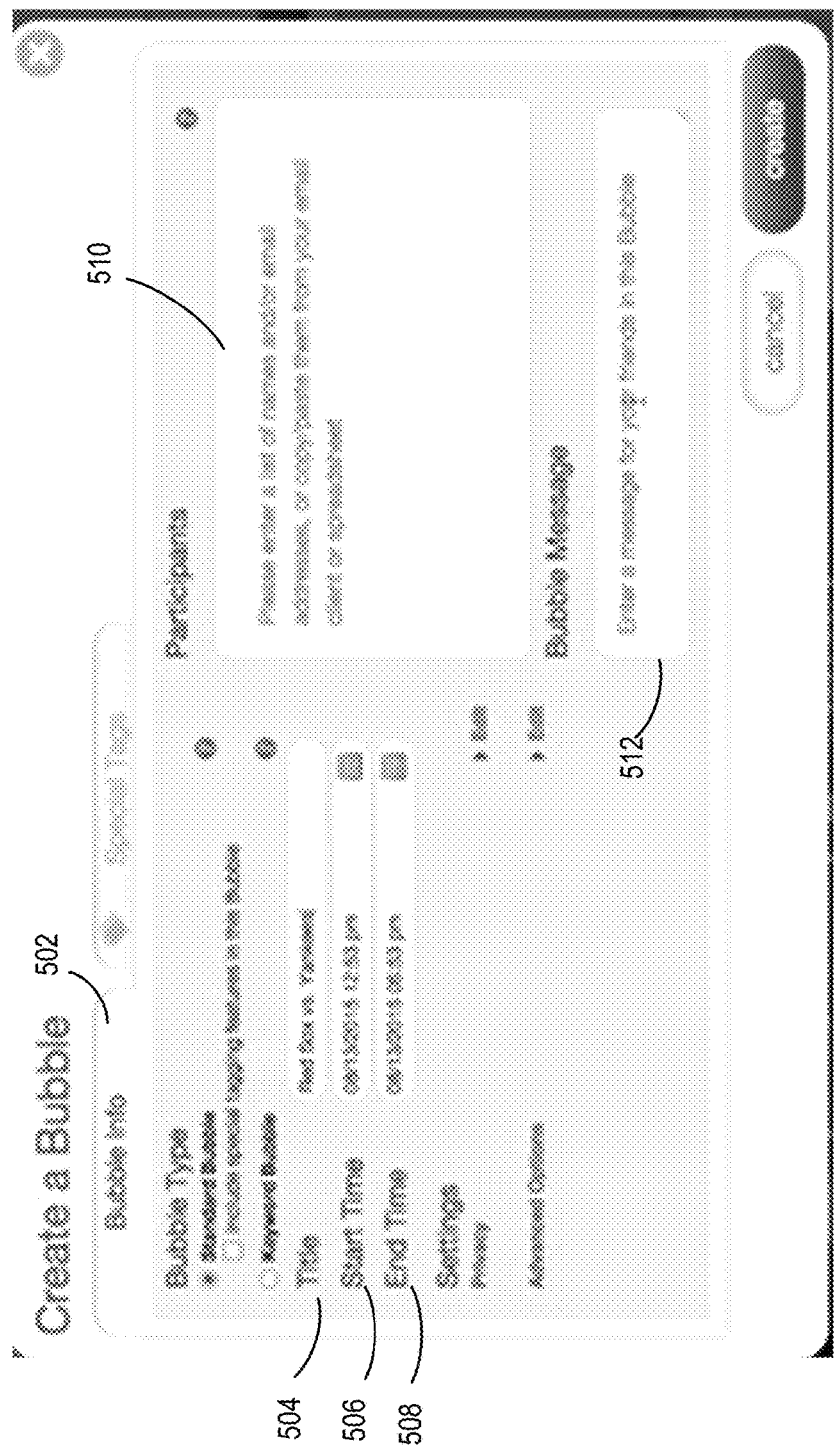
FIG. 5 is a diagram of a graphical user interface for an individual to create a bubble according to an embodiment.

In this disclosure, "an element" may be included in an interface. An element may be displayable and/or part of an interface. Examples of elements include, without limitation, a control, a button, a navigation bar, or other visible component that can be part of an interface that can be perceived by sound, vision, touch, or combinations thereof. An element can receive input. For example, an interactive element may be an element that is interactive to receive input. An interactive element may receive input to enable interaction with the graphical interface FIG. 5 is a diagram of a graphical user interface for an individual to create a bubble according to an embodiment. A bubble info tab 502 provides various fields for defining attributes of the bubble. A bubble title 504 is provided, along with a start time 506 and an end time 508. A participant's field 510 allows the entry of names, phone numbers and/or email addresses of those who will be invited to submit media to the bubble. A bubble message field 512 provides a message to participants.

Figure 6:
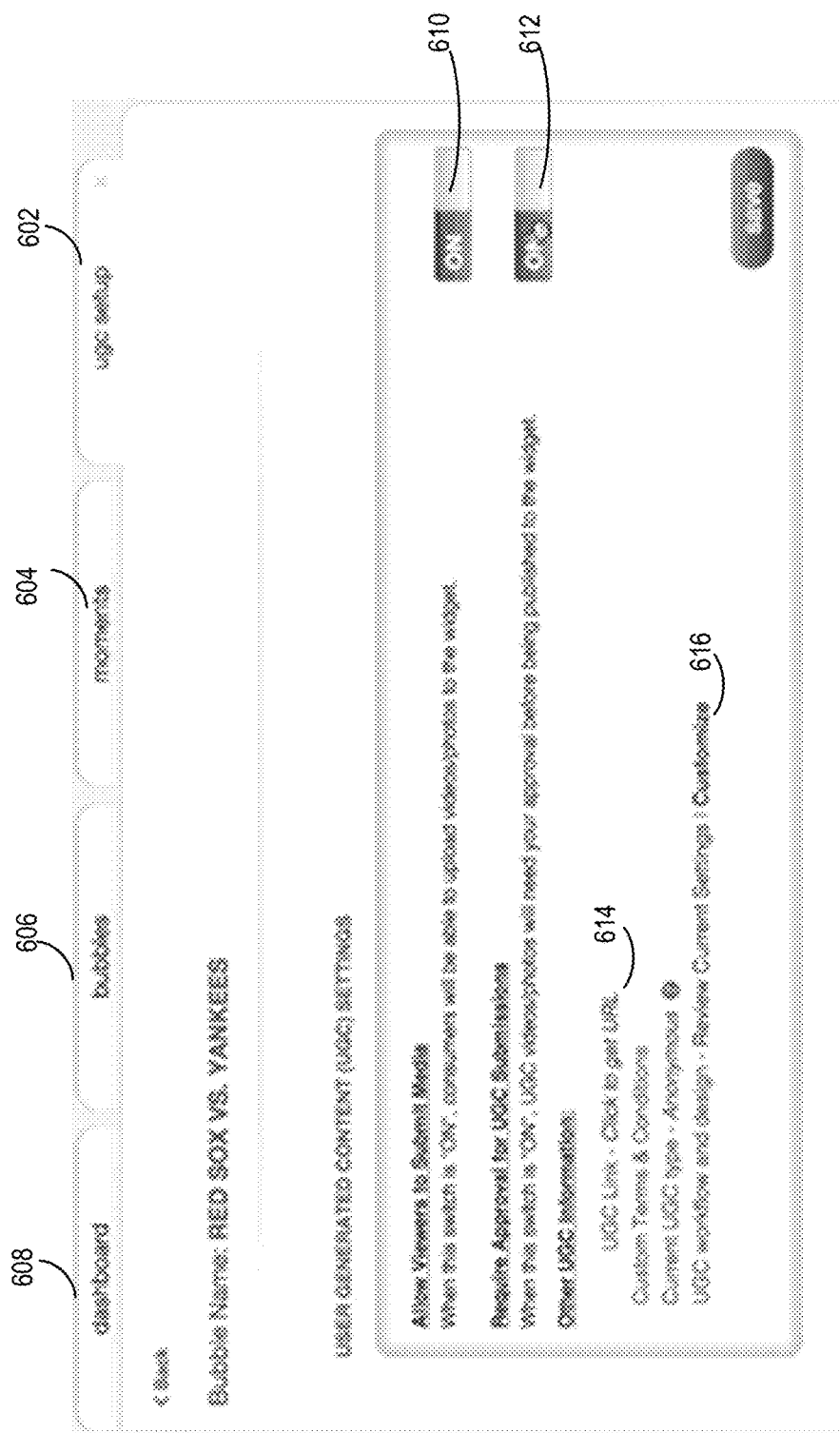
FIG. 6 is a diagram of a graphical user interface for UGC settings for a bubble according to an embodiment.

FIG. 6 is a diagram of a graphical user interface for UGC settings for a bubble according to an embodiment. A UGC setup tab 602 is shown. Other tabs are provided as well, including a moments tab 604, a bubbles tab 606 and a dashboard tab 608. Moments tab 604 allows managing of media. Bubbles tab 606 provides for managing multiple bubbles, and selecting a particular bubble. Dashboard tab 608 provides for tracking views, media, bubbles and adding new media and bubbles. Shown on tab 602 is a particular selected bubble. A switch 610 allows setting the bubble to "ON" which allows viewers to submit media. A button 612 can be used to require approval before any UGC is published to a widget (e.g., widget 124 of FIG. 2). For a media company, particular editors can be given approval control via an administrative setting. A line 614 can be clicked to obtain a URL for the bubble. A link 616 (a URL) allows customization of the UGC workflow and design.

Figure 7:
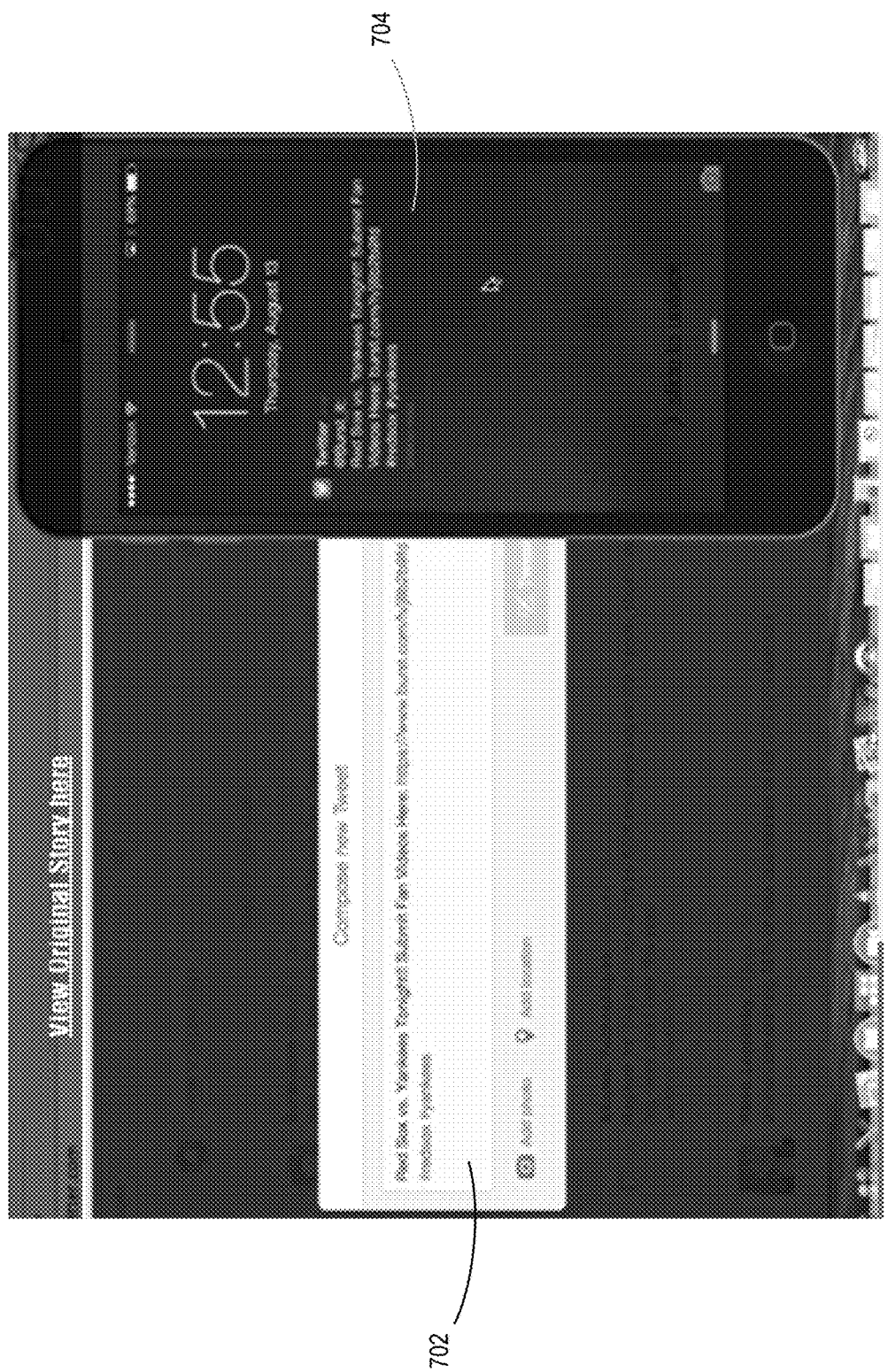
FIG. 7 is a diagram of a graphical user interface for announcing a bubble on Twitter, and receiving the announcement, according to an embodiment.

FIG. 7 is a diagram of a graphical user interface for sharing media content from a bubble on Twitter®, according to an embodiment. A window 702 is shown for composing a new tweet. The tweet can include the URL to use for media submissions. An interface to Twitter® is provided as shown as part of the social interface 130 of FIG. 2. The tweet 704 is shown as it appears on a user device. As described above, other media can be similarly used, such as Facebook®, email mailing lists, etc.

Figure 8B:
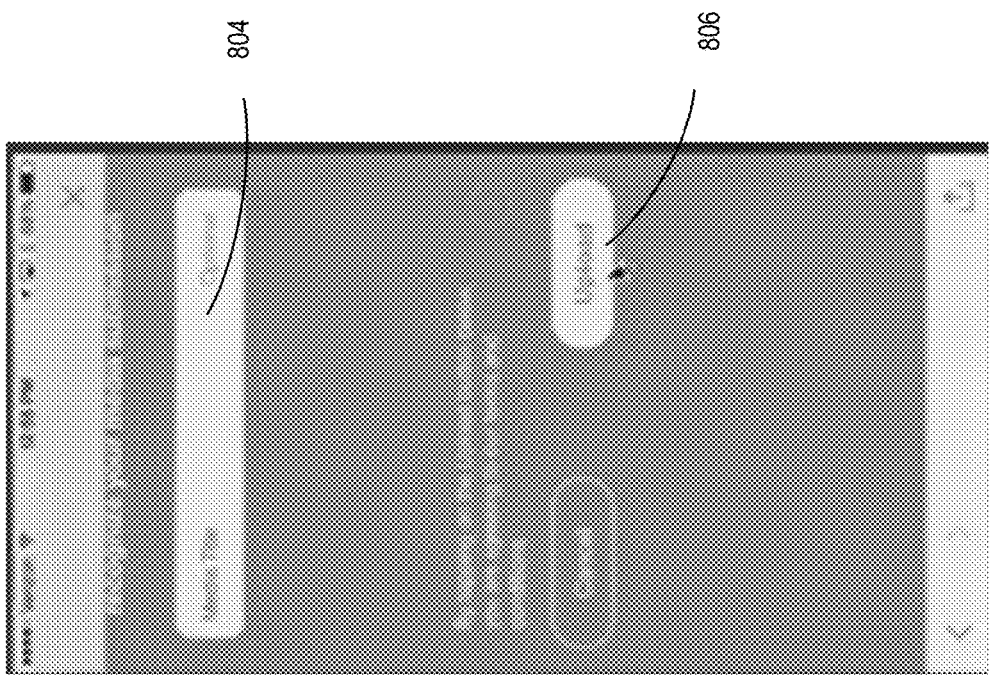
FIGS. 8A-B are diagrams of a graphical user interface for submitting media to a bubble according to an embodiment.
Figure 8A:
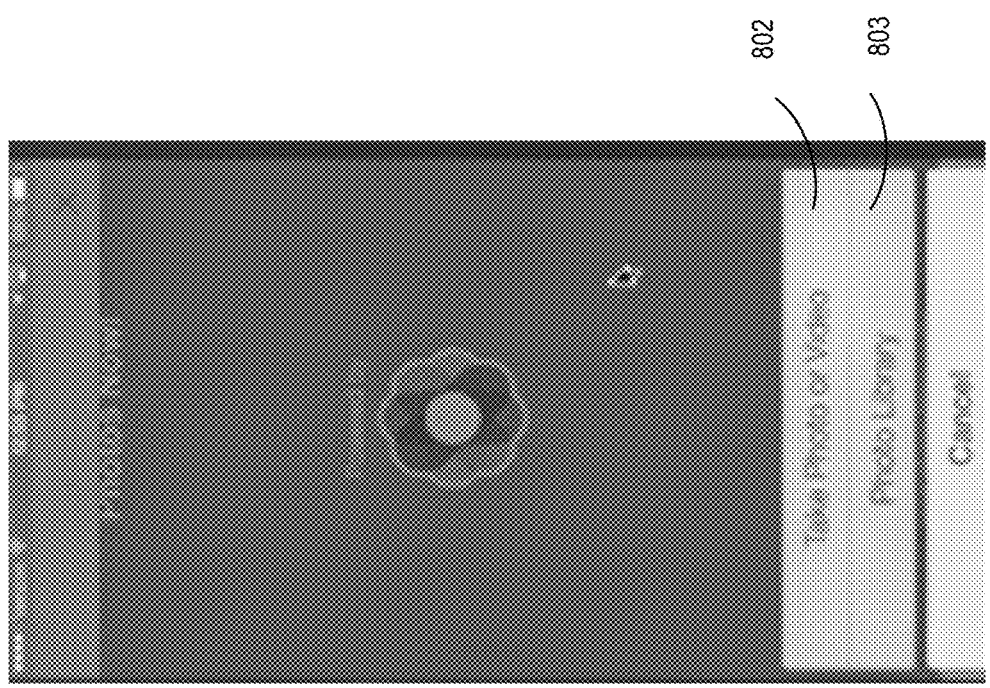

FIGS. 8A-B are diagrams of a graphical user interface for submitting media to a bubble according to an embodiment. As shown in FIG. 8A, the user can go to the URL provided, for example, as shown in FIG. 7. Instead of downloading an app to the user, the URL provides a website which does all the prompting and processing needed to help the user to upload media. The user is then prompted with a button 802 to take a photo or video, or with a button 803 to select a photo or video already taken. As shown in FIG. 8B, The user can optionally provide a name for the media in field 804, and then can upload the media using button 806. Although photos and videos are shown in this example, other media can be uploaded, such as audio recordings, graphics, or other documents.

Figure 9:
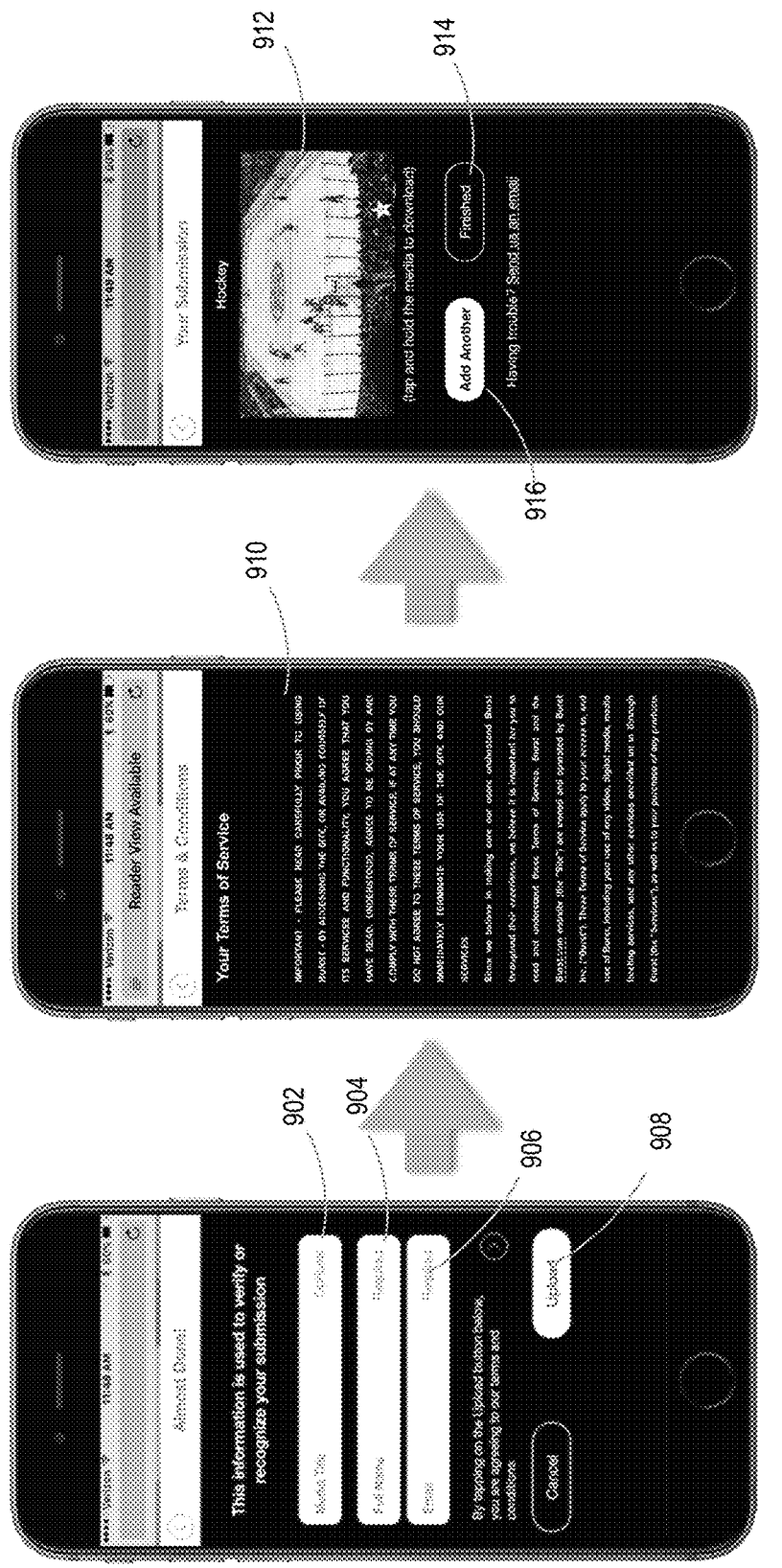
FIG. 9 is a diagram of additional elements of a graphical user interface for submitting media to a bubble according to an embodiment.

FIG. 9 is a diagram of additional elements of a graphical user interface for submitting media to a bubble according to an embodiment. A new user is prompted to enter a media title in field 902, the user's name in field 904 and the user's email address in field 906. The user's name and email are used to register, and can automatically be provided for subsequent uploads from the same device.

An upload button 908 initiates the upload. The upload is optimized for the available bandwidth on the device at that moment. The media is chunked into small chunks as specified by a server-side customizable parameter for access from content system 106. Multiple parallel connections to the content system 106 are initiated. The progress of uploading each chunk is monitored. Periodically, additional parallel connections are initiated if the bandwidth is available to support that. If the uploads begin to slow down, parallelization is reduced. Failed chunk uploads are retried automatically. In one embodiment, the connections to content system 106 are made to an edge server within the CloudFront CDN, which is specifically customized and utilized to handle uploads. By clicking the upload button 908, the user is agreeing to the terms and conditions, as shown in screen 910. This provides the consent of the user for use of the uploaded media. The media as uploaded is then shown in screen 912 for user verification by clicking a "Finished" button 914. Alternately, the user may click "add another" button 916 to initiate another upload, and return to the photo/media selection screen of FIG. 8A. The customer can decide through the UGC setup tab 602 whether they want the terms and conditions presented in a manner that requires reading them first, or not.

Figure 10:
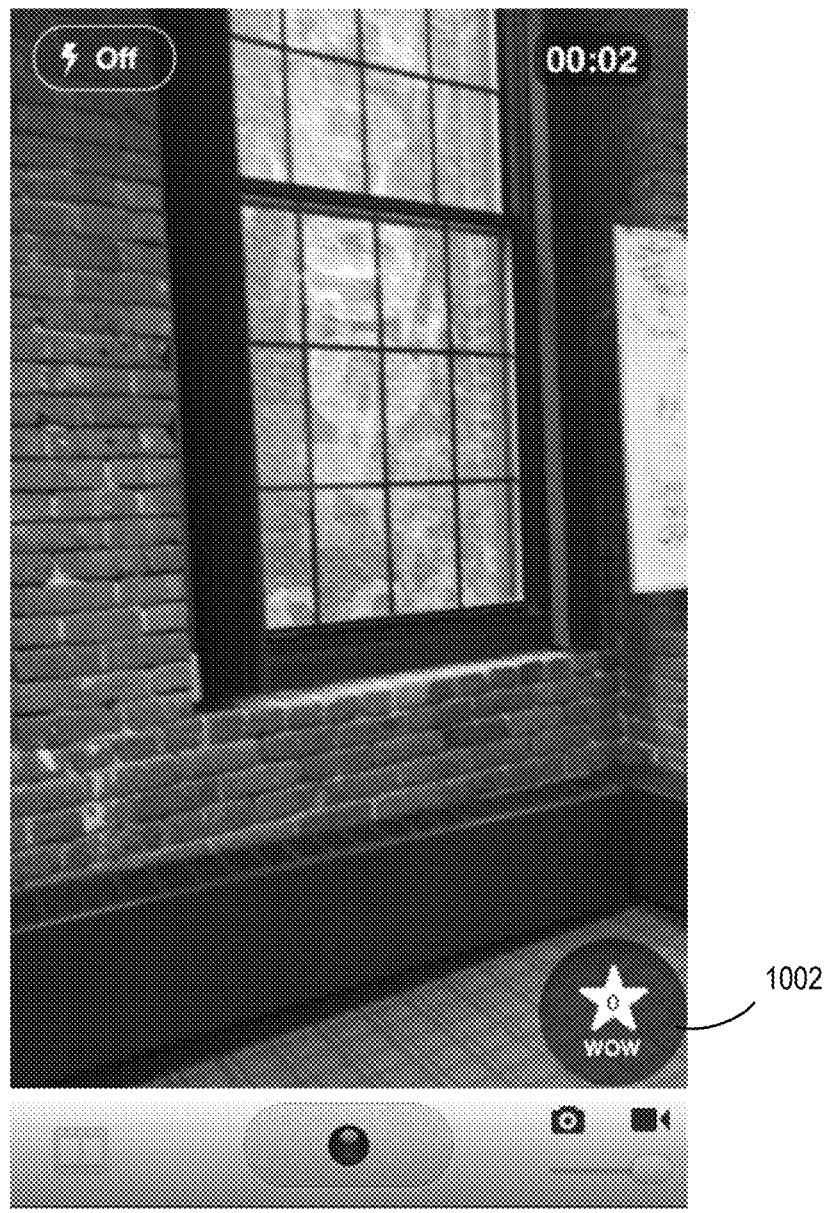
FIG. 10 is a diagram illustrating the addition of a WOW tag to UGC media according to an embodiment.

FIG. 10 is a diagram illustrating the addition of a WOW marker to UGC media according to an embodiment. A WOW button 1002 is shown that can be used to indicate particularly good photos or videos or other media, or particularly good portions. In one embodiment, the WOW button can pop-up on a video for the user to click to indicate the start of the good portion, and the user can click again at the end of the good portion. In alternate embodiments, the WOW button can be pulled up from a menu, caused to appear with a particular keystroke or combination of keystrokes or gestures, or can be provided in other ways. The WOW marker could be initiated by the user verbally saying "WOW" in another example. The WOW marker is added to the meta data for the media, along with a timestamp for the start and stop times of the WOW marker, if applicable. If particular start and stop times are not indicated, the WOW marker applies to the whole video or other media.

Figure 11:
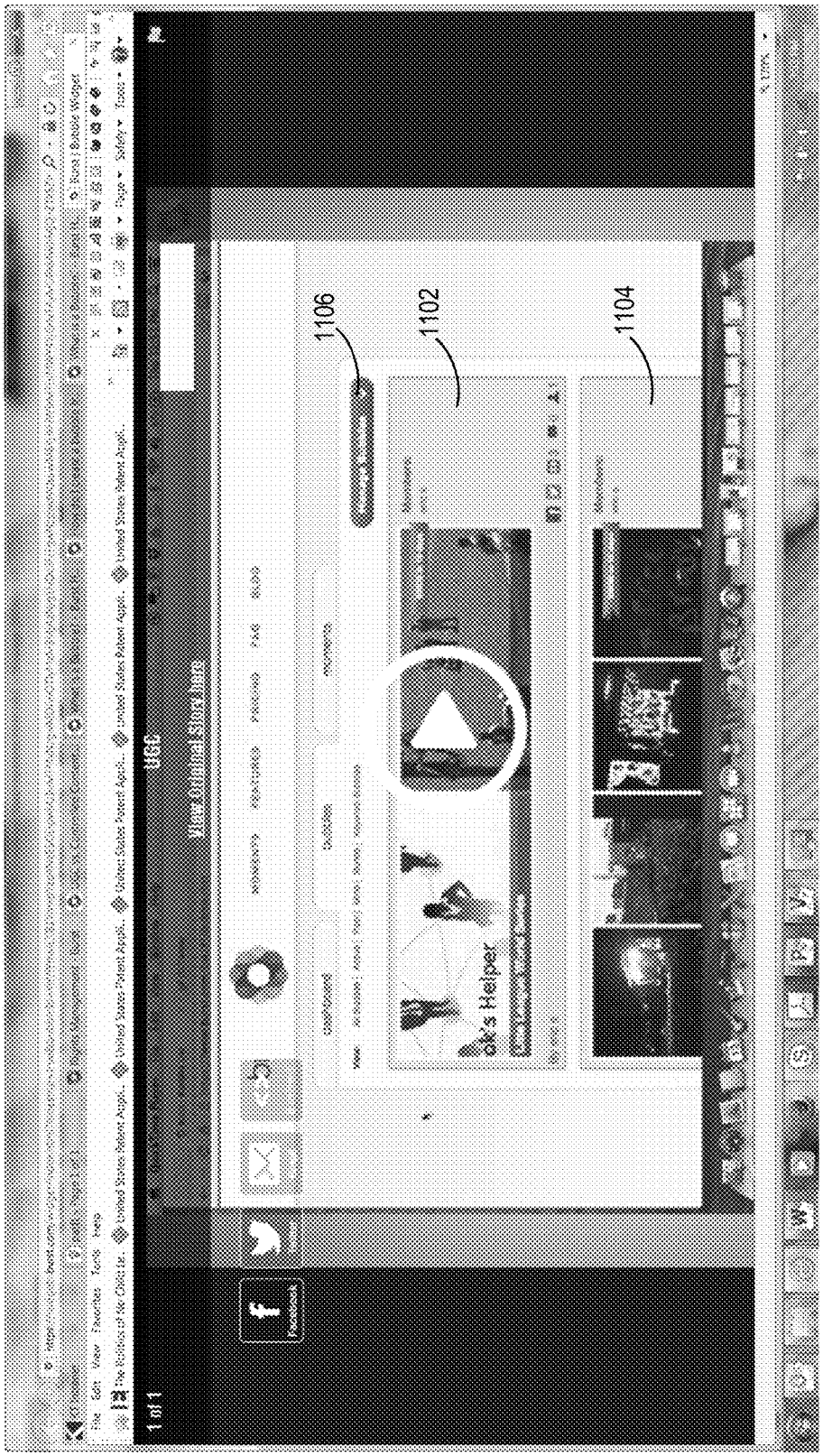
FIG. 11 is a diagram illustrating multiple bubbles according to an embodiment.

FIG. 11 is a diagram illustrating multiple bubbles according to an embodiment. Two bubbles 1102 and 1104 are illustrated, each being displayed with a thumbnail of the videos/photos in the bubble. The user can select to see all bubbles, the user's own bubbles, or can search for bubbles by keyword. The user can click the "Manage Bubbles" button 1106 to manage a group of bubbles or a particular bubble.

Figure 12:
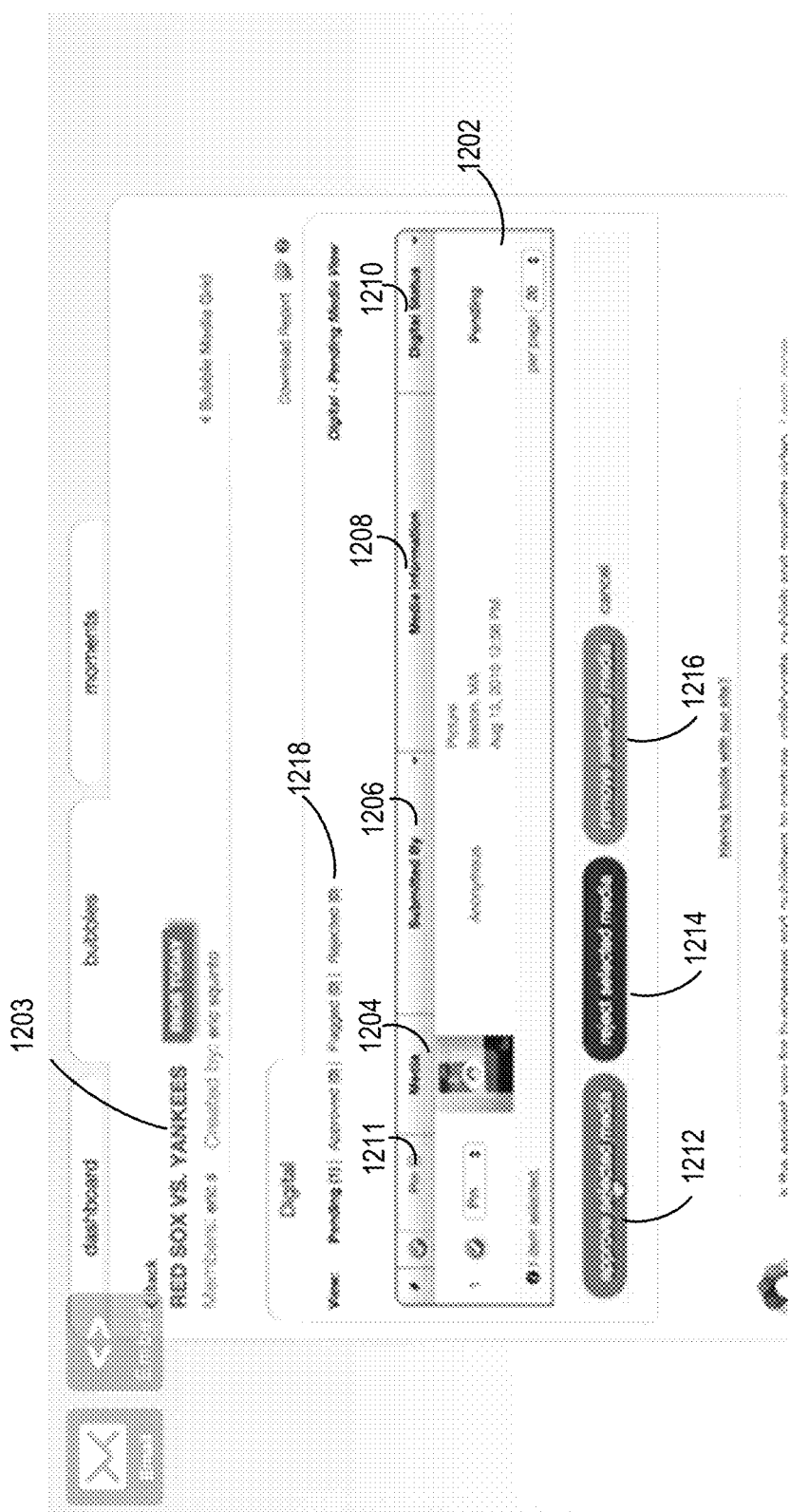
FIG. 12 is a diagram illustrating the management of media in a bubble according to an embodiment.

FIG. 12 is a diagram illustrating the management of media in a bubble according to an embodiment. A window 1202 identifies a particular media with a title 1203, a thumbnail 1204 and metadata. The metadata includes the name of the submitter 1206, or anonymous, and media information 1208 including the type of media, the location where the media was recorded, and the time when the media was recorded. The status 1210 is also indicated ("pending" status in this example). The window 1202 is managed by an editor with editing or approval rights. The editor can click the thumbnail to view the media. The editor can further decide to position the media at particular position within the bubble, or "pin" it by using a pin field 1211. The editor can then select key 1212 to approve the selected media for publishing, reject the media with button 1214 or remove the media with button 1216. The editor can use menu 1218 to switch between different groupings of media to view, such as pending, approved, flagged and rejected.

Figure 13A:
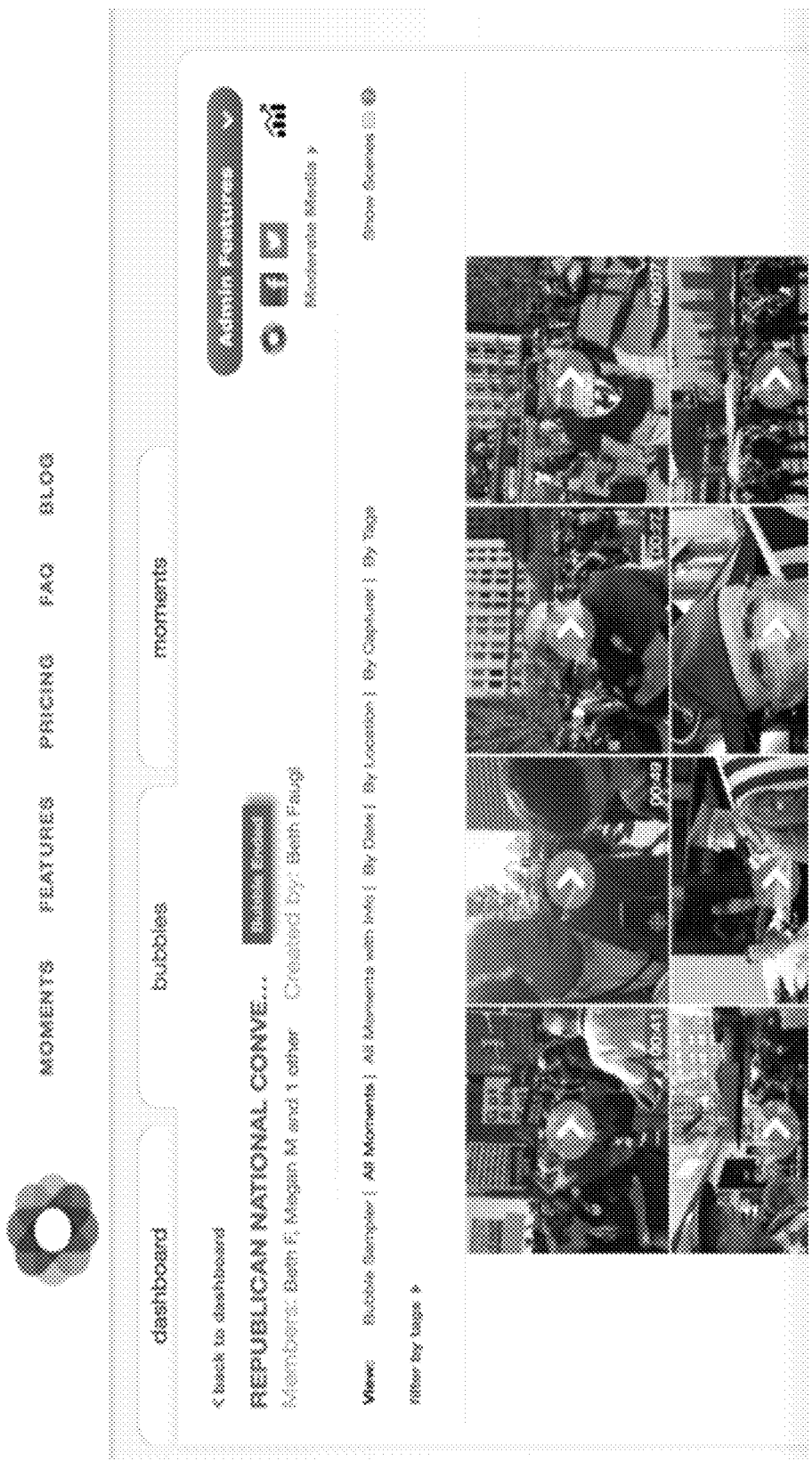
FIGS. 13A-B are diagrams illustrating a bubble and information about media in the bubble according to an embodiment.
Figure 13B:
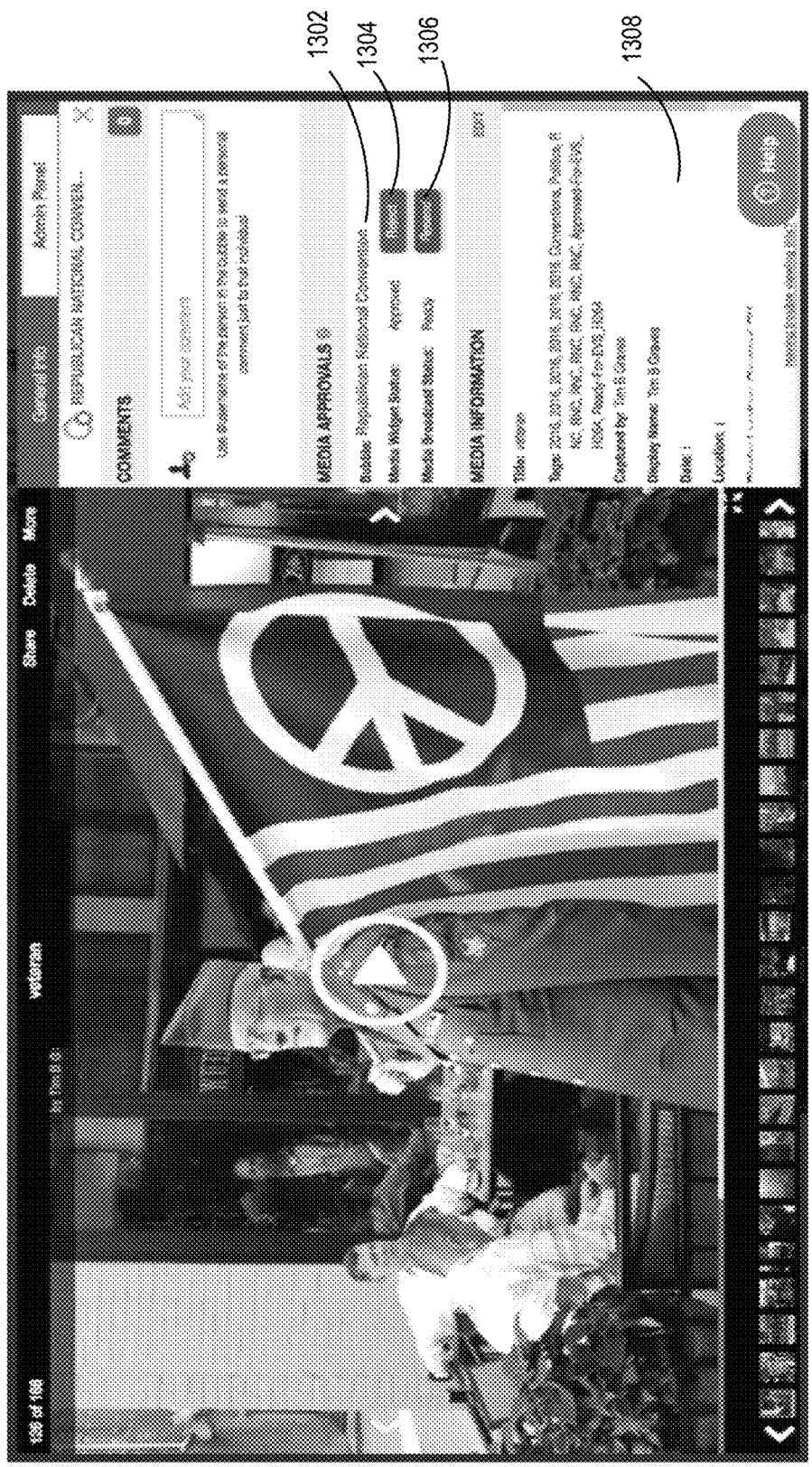

FIGS. 13A-13B are diagrams illustrating a bubble and information about media in the bubble according to an embodiment. FIG. 13A illustrates thumbnails of a variety of media in a bubble. FIG. 13B shows the selection of a particular media, with an information panel. The panel includes the bubble name 1302 and buttons for media widget status 1304 and media broadcast status 1306. A media information field 1308 includes metadata associated with the media.

III. Computer Systems for Content System and Client System

Figure 14:
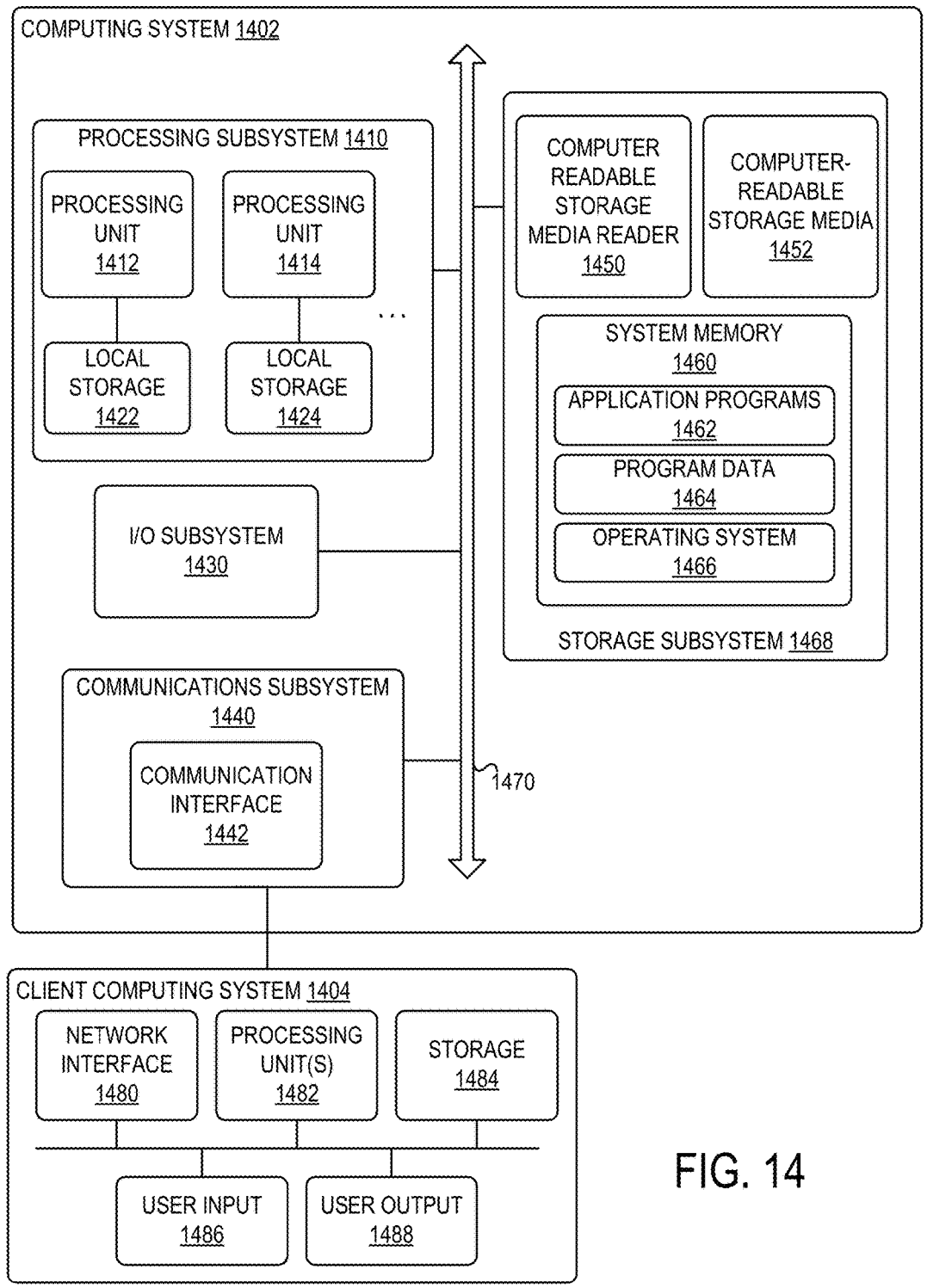
FIG. 14 is a simplified block diagram of a representative computing system and client computing system usable to implement certain embodiments.

Various operations described herein may be implemented on computer systems, which may be of generally conventional design. FIG. 14 shows a simplified block diagram of a representative computing system 1402 and client computing system 1404 usable to implement certain embodiments of the present disclosure. In various embodiments, computing system 1402 or similar systems may implement the Burst servers or computers, or any other computing system described herein or portions thereof. Client computing system 1404 or similar systems may implement user devices or broadcast destination devices, or other client systems described herein.

Computing system 1402 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Computing system 1402 may include processing subsystem 1410. Processing subsystem 1410 may communicate with a number of peripheral systems via bus subsystem 1470. These peripheral systems may include I/O subsystem 1430, storage subsystem 1468, and communications subsystem 1440.

Bus subsystem 1470 provides a mechanism for letting the various components and subsystems of server computing system 1404 communicate with each other as intended. Although bus subsystem 1470 is shown schematically as a single bus, alternative embodiments of the bus subsystem may utilize multiple buses. Bus subsystem 1470 may form a local area network that supports communication in processing subsystem 1410 and other components of server computing system 1420. Bus subsystem 1470 may be implemented using various technologies including server racks, hubs, routers, etc. Bus subsystem 1470 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P1386.1 standard, and the like.

I/O subsystem 1430 may include devices and mechanisms for inputting information to computing system 1402 and/or for outputting information from or via computing system 1402. In general, use of the term "input device" is intended to include all possible types of devices and mechanisms for inputting information to computing system 1402. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices.

User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computing system 1402 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Processing subsystem 1410 controls the operation of computing system 1402 and may comprise one or more processing units 1412, 1414, etc. A processing unit may include one or more processors, including single core processor or multicore processors, one or more cores of processors, or combinations thereof. In some embodiments, processing subsystem 1410 may include one or more special purpose co-processors such as graphics processors, digital signal processors (DSPs), or the like. In some embodiments, some or all of the processing units of processing subsystem 1410 may be implemented using customized circuits, such as application specific integrated circuits (ASICs), or field programmable gate arrays (FPGAs). In some embodiments, such integrated circuits execute instructions that are stored on the circuit itself. In other embodiments, processing unit(s) may execute instructions stored in local storage, e.g., local storage 1422, 1424. Any type of processors in any combination may be included in processing unit(s) 1412, 1414.

In some embodiments, processing subsystem 1410 may be implemented in a modular design that incorporates any number of modules (e.g., blades in a blade server implementation).

Each module may include processing unit(s) and local storage. For example, processing subsystem 1410 may include processing unit 1412 and corresponding local storage 1422, and processing unit 1414 and corresponding local storage 1424.

Local storage 1422, 1424 may include volatile storage media (e.g., conventional DRAM, SRAM, SDRAM, or the like) and/or non-volatile storage media (e.g., magnetic or optical disk, flash memory, or the like). Storage media incorporated in local storage 1422, 1424 may be fixed, removable or upgradeable as desired. Local storage 1422, 1424 may be physically or logically divided into various subunits such as a system memory, a ROM, and a permanent storage device. The system memory may be a read-and-write memory device or a volatile read-and-write memory, such as dynamic random access memory. The system memory may store some or all of the instructions and data that processing unit(s) 1412, 1414 need at runtime. The ROM may store static data and instructions that are needed by processing unit(s) 1412, 1414. The permanent storage device may be a non-volatile read-and-write memory device that may store instructions and data even when a module including one or more processing units 1412, 1414 and local storage 1422, 1424 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1422, 1424 may store one or more software programs to be executed by processing unit(s) 1412, 1414, such as an operating system and/or programs implementing various server functions such as functions of content system 106, or any other server(s) associated with content system 106. "Software" refers generally to sequences of instructions that, when executed by processing unit(s) 1412, 1414 cause computing system 1402 (or portions thereof) to perform various operations, thus defining one or more specific machine implementations that execute and perform the operations of the software programs. The instructions may be stored as firmware residing in read-only memory and/or program code stored in non-volatile storage media that may be read into volatile working memory for execution by processing unit(s) 1412, 1414. In some embodiments, the instructions may be stored by storage subsystem 1468 (e.g., computer readable storage media). In various embodiments, the processing units may execute a variety of programs or code instructions and may maintain multiple concurrently executing programs or processes. At any given time, some or all of the program code to be executed may be resident in local storage 1422, 1424 and/or in storage subsystem including potentially on one or more storage devices. Software may be implemented as a single program or a collection of separate programs or program modules that interact as desired. From local storage 1422, 1424 (or non-local storage described below), processing unit(s) 1412, 1414 may retrieve program instructions to execute and data to process in order to execute various operations described above.

Storage subsystem 1468 provides a repository or data store for storing information that is used by computing system 1402. Storage subsystem 1468 provides a tangible non-transitory computer-readable storage medium for storing the basic programming and data constructs that provide the functionality of some embodiments. Software (programs, code modules, instructions) that when executed by processing subsystem 1410 provide the functionality described above may be stored in storage subsystem 1468. The software may be executed by one or more processing units of processing subsystem 1410. Storage subsystem 1468 may also provide a repository for storing data used in accordance with the present disclosure.

Storage subsystem 1468 may include one or more non-transitory memory devices, including volatile and non-volatile memory devices. As shown in FIG. 14, storage subsystem 1468 includes a system memory 1460 and a computer-readable storage media 1452. System memory 1460 may include a number of memories including a volatile main RAM for storage of instructions and data during program execution and a non-volatile ROM or flash memory in which fixed instructions are stored. In some implementations, a basic input/output system (BIOS), containing the basic routines that help to transfer information between elements within computing system 1402, such as during start-up, may typically be stored in the ROM. The RAM typically contains data and/or program modules that are presently being operated and executed by processing subsystem 1410. In some implementations, system memory 1460 may include multiple different types of memory, such as static random access memory (SRAM) or dynamic random access memory (DRAM). Storage subsystem 1468 may be based on magnetic, optical, semiconductor, or other data storage media. Direct attached storage, storage area networks, network-attached storage, and the like may be used. Any data stores or other collections of data described herein as being produced, consumed, or maintained by a service or server may be stored in storage subsystem 1468.

By way of example, and not limitation, as depicted in FIG. 14, system memory 1460 may store application programs 1462, which may include client applications, Web browsers, mid-tier applications, relational database management systems (RDBMS), etc., program data 1464, and one or more operating systems 1466. By way of example, an example operating systems may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1452 may store programming and data constructs that provide the functionality of some embodiments. Software (programs, code modules, instructions) that when executed by processing subsystem 1410 a processor provide the functionality described above may be stored in storage subsystem 1468. By way of example, computer-readable storage media 1452 may include non-volatile memory such as a hard disk drive, a magnetic disk drive, an optical disk drive such as a CD ROM, DVD, a Blu-Ray® disk, or other optical media. Computer-readable storage media 1452 may include, but is not limited to, Zip® drives, flash memory cards, universal serial bus (USB) flash drives, secure digital (SD) cards, DVD disks, digital video tape, and the like. Computer-readable storage media 1452 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1452 may provide storage of computer-readable instructions, data structures, program modules, and other data for computing system 1402.

In certain embodiments, storage subsystem 1468 may also include a computer-readable storage media reader 1450 that may further be connected to computer-readable storage media 1452. Together and, optionally, in combination with system memory 1460, computer-readable storage media 1452 may comprehensively represent remote, local, fixed, and/or removable storage devices plus storage media for storing computer-readable information.

In certain embodiments, computing system 1402 may provide support for executing one or more virtual machines. Computing system 1402 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computing system 1402. Accordingly, multiple operating systems may potentially be run concurrently by computing system 1402. Each virtual machine generally runs independently of the other virtual machines.

Communication subsystem 1440 provides an interface to other computer systems and networks. Communication subsystem 1440 serves as an interface for receiving data from and transmitting data to other systems from computing system 1402. For example, communication subsystem 1440 may enable computing system 1402 to establish a communication channel to one or more client computing devices via the Internet for receiving and sending information from and to the client computing devices.

Communication subsystem 1440 may support both wired and/or wireless communication protocols. For example, in certain embodiments, communication subsystem 1440 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communication subsystem 1440 may provide wired network connectivity (e.g., Ethernet) in addition to or instead of a wireless interface.

Communication subsystem 1440 may receive and transmit data in various forms. For example, in some embodiments, communication subsystem 1440 may receive input communication in the form of structured and/or unstructured data feeds, event streams, event updates, and the like. For example, communication subsystem 1440 may be configured to receive (or send) data feeds in real-time from users of social media networks and/or other communication services such as Twitter® feeds, Facebook® updates, web feeds such as Rich Site Summary (RSS) feeds, and/or real-time updates from one or more third party information sources.

In certain embodiments, communication subsystem 1440 may be configured to receive data in the form of continuous data streams, which may include event streams of real-time events and/or event updates, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

Communication subsystem 1440 may also be configured to output the structured and/or unstructured data feeds, event streams, event updates, and the like to one or more databases that may be in communication with one or more streaming data source computers coupled to computing system 1402.

Communication subsystem 1440 may provide a communication interface 1442, e.g., a WAN interface, which may provide data communication capability between the local area network (bus subsystem 1470) and a larger network, such as the Internet. Conventional or other communications technologies may be used, including wired (e.g., Ethernet, IEEE 802.3 standards) and/or wireless technologies (e.g., Wi-Fi, IEEE 802.11 standards).

Computing system 1402 may operate in response to requests received via communication interface 1442. Further, in some embodiments, communication interface 1442 may connect computing systems 1402 to each other, providing scalable systems capable of managing high volumes of activity. Conventional or other techniques for managing server systems and server farms (collections of server systems that cooperate) may be used, including dynamic resource allocation and reallocation.

Computing system 1402 may interact with various user-owned or user-operated devices via a wide-area network such as the Internet. An example of a user-operated device is shown in FIG. 14 as client computing system 1402. Client computing system 1404 may be implemented, for example, as a consumer device such as a smart phone, other mobile phone, tablet computer, wearable computing device (e.g., smart watch, eyeglasses), desktop computer, laptop computer, and so on.

For example, client computing system 1404 may communicate with computing system 1402 via communication interface 1442. Client computing system 1404 may include conventional computer components such as processing unit(s) 1482, storage device 1484, network interface 1480, user input device 1486, and user output device 1488. Client computing system 1404 may be a computing device implemented in a variety of form factors, such as a desktop computer, laptop computer, tablet computer, smart phone, other mobile computing device, wearable computing device, or the like.

Processing unit(s) 1482 and storage device 1484 may be similar to processing unit(s) 1412, 1414 and local storage 1422, 1424 described above. Suitable devices may be selected based on the demands to be placed on client computing system 1404; for example, client computing system 1404 may be implemented as a "thin" client with limited processing capability or as a high-powered computing device. Client computing system 1404 may be provisioned with program code executable by processing unit(s) 1482 to enable various interactions with computing system 1402 of a message management service such as accessing messages, performing actions on messages, and other interactions described above. Some client computing systems 1404 may also interact with a messaging service independently of the message management service.

Network interface 1480 may provide a connection to a wide area network (e.g., the Internet) to which communication interface 1440 of computing system 1402 is also connected. In various embodiments, network interface 1480 may include a wired interface (e.g., Ethernet) and/or a wireless interface implementing various RF data communication standards such as Wi-Fi, Bluetooth, or cellular data network standards (e.g., 3G, 4G, LTE, etc.).

User input device 1486 may include any device (or devices) via which a user may provide signals to client computing system 1404; client computing system 1404 may interpret the signals as indicative of particular user requests or information. In various embodiments, user input device 1486 may include any or all of a keyboard, touch pad, touch screen, mouse or other pointing device, scroll wheel, click wheel, dial, button, switch, keypad, microphone, and so on.

User output device 1488 may include any device via which client computing system 1404 may provide information to a user. For example, user output device 1488 may include a display to display images generated by or delivered to client computing system 1404. The display may incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments may include a device such as a touchscreen that function as both input and output device. In some embodiments, other user output devices 1488 may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 1412, 1414 and 1482 may provide various functionality for computing system 1402 and client computing system 1404, including any of the functionality described herein as being performed by a server or client, or other functionality associated with message management services.

It will be appreciated that computing system 1402 and client computing system 1404 are illustrative and that variations and modifications are possible. Computer systems used in connection with embodiments of the present disclosure may have other capabilities not specifically described here. Further, while computing system 1402 and client computing system 1404 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

IV. Auto Montages Creation and Management

In one embodiment, montages are automatically created from media uploaded to a particular bubble. A montage may be media that is created based on media content. A montage (also referred to as an "auto-montage") as referenced herein may be automatically created based on media content. In one example, a bubble may be created for a concert event where people are taking pictures and videos of themselves at the concert, their view of the stage, activity outside the concert, activity near the concession stands, etc. Particular media are selected, and particular fragments are used from the selected media. Techniques disclosed with reference to FIG. 15 may be implemented by some or all of elements described with reference to FIGS. 1-14. For example, content system 106 may implement operations disclosed with reference to FIG. 15 for automatically creating montages.

Figure 15:
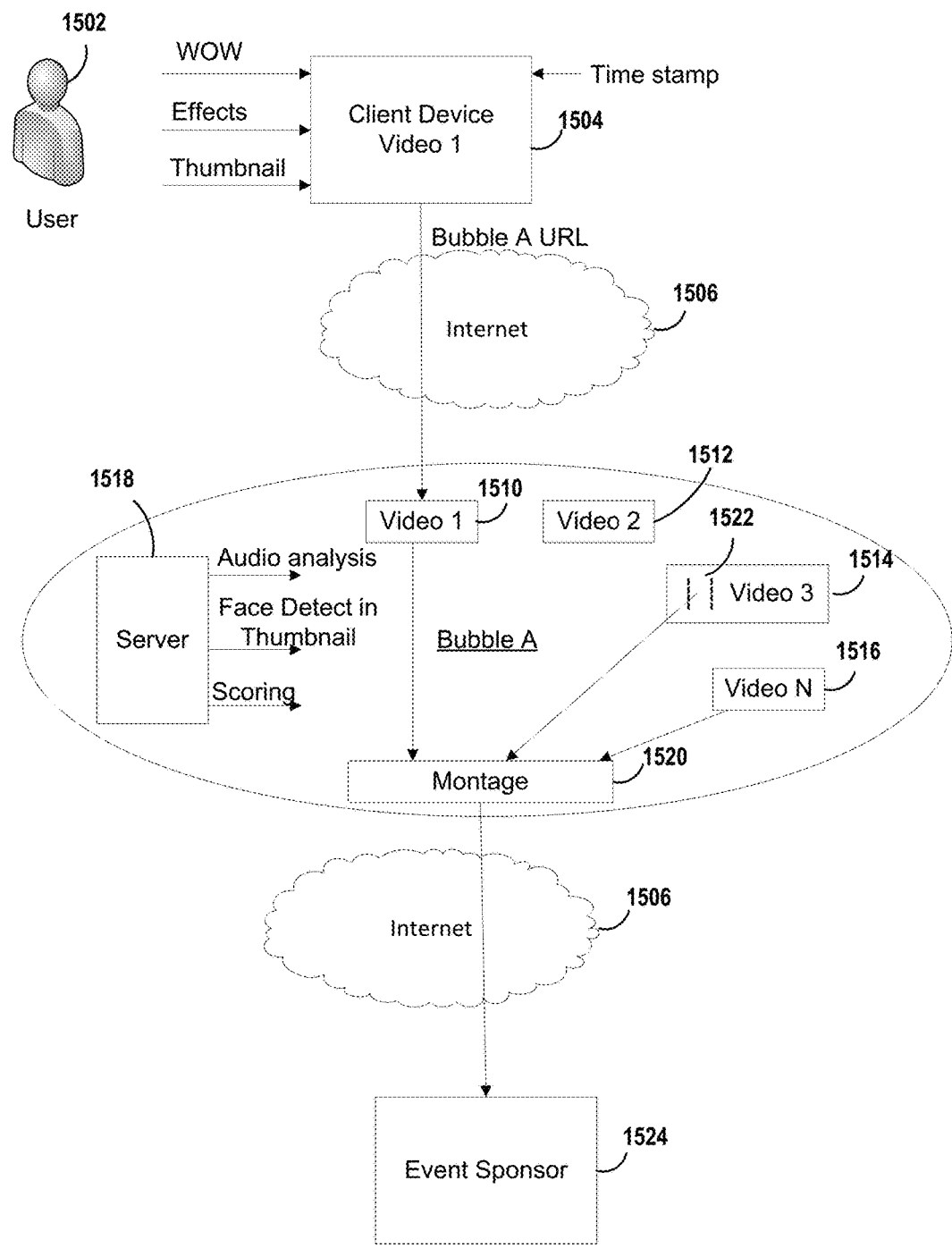
FIG. 15 shows a simplified block diagram of the process flow to upload media to a bubble and create a montage according to an embodiment.

FIG. 15 shows a simplified block diagram of the process flow to upload media to a bubble and create a montage according to an embodiment. A user 1502 operates a client device 1504 (smartphone, tablet, etc.) to manipulate a video (e.g., a first video or "video 1"). The video may have been captured by the device 1502 with a timestamp, or may have been downloaded or otherwise received by user 1502.

Content system 106 may provide one or more interfaces to enable the user to manipulate video. The user can perform one or more operations on media, such as applying meta data, editing the media, or marking the media with meta data. Content system 106 may, for example, provide a graphical interface to perform operations on media. Media may be edited with various markers, such as WOW marker or an effect marker. Media may be processed for accessibility. For example, portions of media may be process to be made accessible as a thumbnail. Operations on media are explained in more detail below.

The user may upload video 1 to a Bubble A over one or more communication networks (e.g., via the Internet 1506), using a bubble A URL that the user found on a website, tweet, etc. A bubble URL may be provided content system 106 to a location, such as a website, a tweet, a social media application, or any other location in which a URL can be accessed. Content system 106 may provide an interface to enable a user operating a client device to provide video 1 to upload to Bubble A. Bubble A may be implemented by content system 106. Video 1 (1510) is uploaded to Bubble A, as are other media from other users, such as video 2 (1512), video 3 (1514) through video N (1516). Videos may be uploaded from any number of clients by any number of users. Videos may be uploaded using one or more URLs provided for a Bubble.

Server computer 1518 may be implemented as part of content system 106. Server computer 1518 may perform further processing, such as audio analysis to identify audio in any frames of a video and object detection (e.g., facial detection to identify faces) in any frames of a video. The analysis may result in the generation of data for the identified audio and objections. The data may be added to the meta data generated for operations performed on a video, such as user providing markers.

Server computer 1518 may then applying one or more weightings (or weights) to each of the operations performed for a video. The weighting(s) may be used in computing a score of each video. The score for each video may be computed with regard to the entire video or some or all portions (e.g., fragments) of the video. A score for a video may be based on scores for one or more portions of the video. For example, the score for a video may be based on a value computed (e.g., averaged) based on the scores of the portions of the video. Server computer 1518 may compute a score for a video automatically. For example, a score of a video may be computed according to a schedule or based on a change in media or affecting the media.

Based on the scores for videos, the videos can be automatically combined into a montage 1520. In one example, a montage may include all of video 1, none of video 2, a fragment 1522 of video 3 and video N. The montage 1520 is then made available for possible editing and use by an entity (e.g., a sponsor) that provides the bubble A URL. Access is accomplished by a computer system (e.g., a sponsor computer 1524) over one or more communication networks (e.g., via the Internet 1506).

In one embodiment, montages are automatically created to allow administrators and users to view highlight reels curated from the content in a bubble. Administrators may be part of an entity or enterprise, such as a media production company or a media content distributor. A montage process may implement techniques (e.g., a processing algorithm) to pull the most interesting fragments from their media. This curation may be implemented based on consideration of the following factors in one embodiment:

Social media engagement metrics;
Approvals to broadcast, digital embeddable widgets, and social shares;
The presence of faces in a media fragment;
The audio content in a fragment; and/or
Objects detected in a fragment These factors aid in improvement of montage quality over time. Over an extended time, decision criteria like social media engagement metrics and approvals appear and are factored into the scoring of media fragments to be included in the montage. In addition, the source of the media can be used as a factor in scoring the media. For example, user generated content (UGC) may be weighted lower than content from a curator for a sponsor (controlled user content), or media from a social media account (e.g., an account provided by Twitter®) with a lot of followers or another published source.

In another embodiment, montages are created based on factors that can be determined immediately, without waiting for social media likes, approvals, etc. Such factors include detecting the presence and count of objects in videos, algorithms that glean the attributes of "good" videos, and look for those attributes in new videos, and use that information to make predictions on how good a video might be. A quality of video may be determined based on one or more criteria defining a quality of video threshold. Quality of video may be defined as good video based on a quality of video threshold. A montages processing algorithm would then use the criteria in deciding which videos to include based on satisfaction of the threshold.

Some content providers distribute media content (e.g., audio, video, and other media) via the Internet without utilizing a broadcast system or service provider, such as an operator of multiple cable or direct-broadcast satellite television systems (so-called multiple-system operators, or "MSOs") controlling or distributing the content. Distribution of such media content via the Internet without utilizing a broadcast system is referred to by some as over-the-top (OTT) content. Automatically created montages can be provided with OTT content and real-Time Commercials, allowing account administrators the benefit of automatic curation of highlight reels and ensuring that the truly compelling content is what makes the cut from a large swathe of media submissions, be it photo or video.

A montage may be produced based on media of different types, such as photos and images. A montage may be generated to include one or more media effects (e.g., audio, image, or video) to transition between different media combined to form the montage. The media effects (or "transitions") may be indicative of a transition between different media forming the montage. A transition may vary between a change from a video to an image, an image to video, or video to video. For example, a transition from a one image to another image may be presented with audio, video, an image, or a combination thereof. The transition may include an animated image, a video, and/or audio for a change between one image and another image.

In some embodiments, analysis is performed to determine a transition in between each of the different media in a montage. Operations may be performed to assess the data for the media to determine a time when to add a transition between the media. For example, the operations to assess the data includes determining a position of an image between a change of images in a montage. In another example, the operations to assess the data for media in a montage includes determining a position in a video for a transition to an image or another video. Analysis of media in a montage may be performed to determine whether one or more criteria are satisfied for a transition. In otherwords, media in a montage may be assessed to determine whether to include a transition between different media and if so, where to include the transition. Each media in a montage may be processed to determine a reference point to insert a transition between different media. For example, a video may be assessed to determine a position at which a transition may be presented for transition to different media. In another example, an image may be assessed to determine a position in the image to overlap a transition to another media. Assessing media for a transition may include analyzing the metadata for the media, such as characteristics in the media, including positions of pixels, color of pixels, and/or movement of pixels.

V. Timestamps for Montages

The fragments of a montage can be arranged in chronological order based on timestamps. Media may have a timestamp. Timestamps can reflect the time the media was recorded, not the time the media was uploaded. Some media may have multiple timestamps that can be examined. For example, there can be a timestamp from the client device that captured the media and a timestamp from a media application itself. Some media formats and some devices, when they capture the media, record the timestamp of the capture into the media itself. Specialized tools are available to extract that timestamp information. In other devices, the timestamp information is removed upon upload by the device or media program for privacy reasons (in addition to removing location information). Accordingly, an upload program is downloaded to the device in one embodiment to handle the upload and also insure that the location and timestamp information is maintained. The location information is used to confirm that the media was actually taken at the event.

For bubbles where submitters can be at multiple locations, the timestamps are normalized according to location to take into account different time zones. For many timestamps, the timestamp itself has a time zone indication. To ensure accurate times, the time zone can also be calculated from the location information and can be matched with the time zone from the timestamp. Error correction logic will override one with the other depending on which has a higher confidence factor.

VI. Montage Processing

For efficient processing, the bubbles are examined as follows to avoid intense processing on each bubble. A scan may be performed of all or some of the bubbles to examine the timestamps and determine if there is any new media since the last scan (e.g., every 10 minutes). A buffer period is added to ensure nothing is missed, such as 30 seconds before the last scan. In addition, any changed or deleted media is detected by looking for a flag that is added for each change, including additions, deletions, or modifications. The bubbles with changes are passed to an asynchronous queuing-messaging system. The queue-messaging system communicates the bubbles with changes to a process a processing layer that looks at every media in the bubble that hasn't been previously examined.

In the processing layer, metrics and weightings (e.g., weights) are computed to determine which videos or photos in the montage are best qualified (e.g., satisfying a threshold) to be included in the montage. For an initial pass, all the media is examined. For a subsequent pass, changed media is examined, and a determination is made whether to add to the existing montage, or delete fragments from the montage. Fragments may be deleted when a maximum montage length is reached, and new media with a higher rating is available. Also, media removed by the user can be deleted. Alternately, the montage may be reconstituted to keep it current, such as by deleting fragments that are older than a certain amount, and adding new fragments, assuming there are enough fragments to reach the maximum montage length.

In one embodiment, a program (e.g., also referred to as "ScheduledMontagesProcessor") creates montages for bubbles with a media count greater than some number, such as 2-5, and recreates the montages when any newly added or deleted media is detected. The "ScheduledMontagesProcessor" checks all the bubbles to see if bubble content has changed in a period of time since the last check (e.g., 10-30 min) and queues up montages for creation or modification where there is a change. In one example, a montage is recreated if:

a) A media contained in the montage has been deleted from bubble;

b) WOW markers have been added to media (a single WOW marker may be enough); and c) Number of media added+Number of media updated >10% of total media in the bubble.

In one embodiment, the bubble media to be used for montage creation are populated in a list and ranked based on certain attributes. The attributes have weights assigned based on how significant the attribute is. Some examples, with example weightings, are shown below:

i. avg_daily_views—weight of 5 (weighting is thus 5×average number of daily views);
   ii. has_title—4;
   iii. num_comments—10 (weight is 10×number of comments. It is weighted high because comments are rare and indicate interest);
   iv. duration—3 (shorter videos are better)—a max duration of a montage is limited, such as to 60-120 seconds, but can be changed through configuration;
   v. num_markers—10 (WOW marker, audio marker; and
   vi. num_tags—2.

A tag may be a piece of text that can be associated with a media. Tags can be of various types including, without limitation, the following tags:

Manual Tags are manually entered in free-form by a user, such as "Interview", "Touchdown", "Great Play", "Review later", etc.;
   Selected tags are selected from a list of suggested tags, by a human, such as "Sports", "Football", "Storm", etc.;

Automated tags are applied programmatically by an object detection system based on an object identified in a video, such as "car", "cloud", "cat", etc.;

Automated tags applied programmatically by an audio detection/classification system which scans the video for various audio patterns, such as "Speech", "Applause", "Singing", "Music", "Silence", etc.; and Control tags applied by a human, such as Approved-For-Broadcast, Approved-For-Digital, that help move the media through a production workflow.

Markers are a way to specify certain attributes to certain points in time or range of time within a video. Examples of markers, include without limitation, the following:

WOW (point in time or range) markers to specify that that portion of the media is very compelling;

Effects markers (e.g., a spotlight, zoom, slow-motion, etc.) to indicate a point-in-time or range where a user applies one or more effects to a video;

Audio markers to specify the range within the video with respect to particular portion of audio. Audio markers may be associated with and/or managed with one or more audio tags. An audio marker and an audio tag value specifies a type of audio;

A thumbnail marker to specify a point in time of a frame within the video that was selected as a thumbnail (e.g., a thumbnail poster) for the video; and Scene change markers to indicate a point-in-time marker placed programmatically by a scene change detection algorithm where it deems a change in scenes (e.g., a change in which one scene as ends and another scene begins).

In one embodiment, media fragments are created from the list of media chosen for montage creation. A media fragment can include a media ID, a start point (e.g., a startOffset), a stop point (e.g., an endOffset), the reason the fragment was chosen and if it has a WOW marker or not. Media fragments are processed to ensure that they don't overlap (e.g., merging overlapping fragments), and to eliminate duplication of fragments. The resolution of all the media file fragments to be used in the montage is determined, and the montage resolution is set to the maximum resolution file, after any transcoding to enhance or otherwise modify the media fragments. A job worker, after downloading each of these media, does an probe on each and computes the most frequent resolution. That is chosen as the maximum resolution of the montage. Alternately, the maximum resolution of any file can be used.

a. Montage Media Fragment Choice

Some or all of the media in a bubble including some or all "marked" fragments within each media can be scored and ordered by the respective score in ascending or descending order. In that order, fragments from each media can be extracted and stitched together until the total length of a montage exceeds a maximum length threshold. The threshold depends on the size of the bubble and, in one example, ranges from ~20 to ~90 secs. If a single video exceeds the threshold, for example, a long range marker in a small bubble, then another media is added so that a minimum of 2 videos is reached. Media may be added so that the minimum of 2 videos is reached according to a standard or threshold of a multimedia processing platform. An example of a multimedia processing platform is a platform provided by the organization FFmpeg.

In at least one embodiment, a score of media in a bubble is computed as follows. For each media, a set of numeric features is calculated and weighted by different weights. Feature values are multiplied by the corresponding weights and added together to produce the score. Table 1 below shows one example of a set of features and their weights. The system is designed to accommodate more features, and allows weights to be changed to produce montages with different emphases for the same bubble.

TABLE 1

| Feature name | Feature weight | Feature/weight description |
| --- | --- | --- |
| avg_daily_views | 5 | total views/days since tm_captured (or tm_uploaded) |
| has_title | 4 | could weigh this more == capturer WOW |
| num_comments | 10 | hard to come by so weight more |
| Duration | 3 | prefer shorter media all else being equal |
| has_fx | 10 | FX marker is a graphical form of a WOW marker |
| num_markers | 10 | WOW/thumbnail/ . . . |
| num_tags | 2 | these more plentiful than comments but not as important/visible as title |

The score of each media in a bubble may be computed dynamically by the server computer 1518 in an automated fashion. The score may be computed automatically based on a schedule (e.g., every 10 minutes), for which the score may account for a change with respect to changes in the feature(s). For example, the score may be recomputed for each media based on a change in any of the features used to compute the score for the media. The score may be recomputed for any media, not just media included in a montage, based on a change in one or more features of the media. The server computer 1518 may track each media in a bubble to determine whether any features related to the media have been modified. A modification in a feature may include editing of the feature, including adding/removing tags, effects, markers, or a combination thereof. By computing the score of media periodically, the server computer 1518 may operate efficiently to enable montages to be generated faster. By determining the score of media based on a schedule and/or a change in the media, server computer 1518 can reduce a delay in processing to determine a montage for a bubble based on the scores for the media in a bubble.

In some embodiments, for each video chosen to be included in the montage the following logic determines the fragment of it that will actually be included in the montage:

1. If video contains no markers, include the first 5 seconds of it.

2. If video has a marker with both start and end offsets null (AKA whole media marker), include the first 5 seconds of it.

3. If video has a marker with a null end offset (AKA point marker) of type a. thumbnail then include 3 seconds before and after the starting offset, b. WOW then include 5 seconds before and after the starting offset.

4. If the video has a marker with non-null start and end offsets (AKA range marker of type WOW), include 1 second before the start and 1 second after the end offsets.

This logic is triggered (fully or partially generating a new montage or leaving the current one in place) on each of the following cases:

getBubbleInfo (ie user clicks/taps on a bubble)
   bubbleBurstNotifyService (ie bubble has burst and the users are about to be informed)
   performActionOnBubbleMedia
      add
      remove
      approve removeBubbleMembers
removeBubbleMember
removeMeFromBubble In one embodiment, the criteria below may be used to decided whether the montage is created, refreshed (media id stays the same, media content changes) or left as is:
- if the number of media (e.g., videos) in bubble exceeds minimum montage threshold (e.g., 5) then generate/refresh montage.
- if montage exists and there are pending jobs, do nothing unless latest pending job was submitted over an hour ago (possibly 'stuck' job).
- if montage does not exist and there are no pending montage jobs for the bubble, create a montage.
- if montage exists and there are no pending montage jobs for the bubble:
  - if there is a cluster set and it was done after the montage then refresh montage. (a cluster set is a set of collections of media within a bubble automatically organized into groups based on similarities in the content between the media)
  - if # media added plus # media changed (since montage created) >10% of the current # bubble media, refresh the existing montage.
  - if any media present in the current montage was removed from the bubble or deleted altogether, refresh the existing montage.
  - otherwise do not refresh the montage.

A montage may be updated to reflect the change in the score of any of the media used to generate the montage. For example, a montage may be updated to change an order or arrangement of the media in the montage based on a change to a score for one of the media in the montage. In another example, the media in the montage may be updated to reduce or increase a length of time for which the media is added to the montage based on a change to a score of the media. In yet another example, the montage may be updated to replace media in the montage with other media based on a change in score of the media in the montage and/or the media not in the montage.

b. Markers

The following descriptions of markers are examples of markers in some embodiments. Any number of markers may be implemented, including more or fewer of the markers disclosed herein. A marker may be implemented as one or more of the markers disclosed herein.

Thumbnail Marker.

A thumbnail marker is where the user, after capturing a video, selected a thumbnail. The marker is an offset from the start time of the video identifying the point the user has selected as a thumbnail.

WOW Marker.

Another marker is a WOW marker that indicates a part of the video that a user has indicated is best or impressive. The WOW markers can be a single point in time or can have a start time and an end time. A downloaded application provides for viewing videos and uploading them to a bubble. The user interface includes a WOW button (e.g., on the bottom right corner). The user can either tap it once or can tap it multiple discrete times or can tap it and hold it and then let go, to mark a range.

Scene Change Marker.

Another type of marker is a scene change marker. A scene change marker is marked by an algorithm that automatically detects where in a video there is enough significantly different content that can be used to identify the beginning of a new scene. For example, a user may record a video, hit the pause button, and then readjust the camera to a new point of view or wait for the next significant activity to happen and then resume recording again. In this case, the content often may be significantly different on that very next frame compared to the previous frame. Logic temporally monitors how frames are changing in the content and determines if the change is sufficient change to indicate a scene change, as defined by a threshold.

Audio Marker.

Logic also monitors audio and uses some algorithms to detect is there speech or silence or music or singing or applause.

Effects Markers.

Examples of effects markers are a zoom or a spotlight, which indicates something deemed particularly interesting to the user. An interesting aspect may be defined as a threshold by one or more criteria. In one embodiment, an app (e.g., iOS or Android app) is downloaded to the client device to handle the uploading of video to a bubble. The app allows the user to apply effects, but does not actually apply them to the video uploaded, keeping the uploaded video size reasonable and allowing the intense processing to be done in the cloud. A user can go into the app and apply a zoom or slow motion or a spotlight, either in combination or independently of each other.

In some embodiments, a file (also referred to herein as a "descriptor file") may be uploaded with the video from the client device to a server computer of content system 106. A descriptor file can be similar to a sidecar file, also known as a buddy file or a connected file. A file is a computer file that can store data (e.g., metadata) which is not supported by the format of a source file. The data may be descriptive of the video to which the file is associated. In some embodiments, a file may include data about one or more effects. Thus, the video does not have to be examined to determine if effects were applied. Rather, the descriptor file can be examined. The presence of the descriptor file can be relied upon without the video. In the actual processing, the descriptor file is used, for example, to render the effect at the right location, at the right time, and at the right coordinates where the user touched the screen. For example, a spotlight and zoom can be applied around an athlete's outstretched hand and a basketball hoop as the ball is going in. Those details are recorded and provided in the descriptor file, so the effect can be applied on the back end.

With respect to scoring of a video, each type of marker is given a weight (some or all could be the same weight). A weighting algorithm determines a score for each video. In one version, the scoring is performed at a video level or a photo level not at a fragment level. In another version, the scoring is performed at the fragment level. In some embodiments, scoring may be implemented based on combinations of a video level, a photo level, or a fragment level.

In one embodiment, in the absence of markers, the first portion of a video is included as a fragment in a montage, such as the first 5-10 seconds of the video. If there is a thumbnail marker, a WOW marker, or an effect marker, those portions of the video are included subject to certain limits. For a thumbnail marker, a number of seconds before and after the thumbnail marker is included (e.g., 3-5 seconds before and after). For WOW markers, the entire video may be included, subject to a maximum length. If the WOW marker is a WOW range marker with start and stop times indicated, the indicated range is included. Overall montages may be limited to, e.g., 90 seconds in length, but WOW markers can be an exception. Video with WOW markers, however long, may be included. Thus, a five-minute long WOW marker will make the montage at least five minutes long.

In one embodiment, to limit the required processing, only meta data or markers associated with the video is examined (WOW, thumbnail, effects markers). However, for audio, where the processing is more straightforward, the audio content is examined. In one embodiment, the video content is examined for face detection, which can indicate a more interesting video fragment. To limit processing and increase speed, face recognition could be performed only on thumbnails and only when there is a need to discard some thumbnails to limit the size of the montage. In other embodiments, more significant aspects of a video that do not demand too much processing power, or that demand use of less computing resources, are also examined. For example, a scene change can be determined from a large change in the values of many pixels, without more intense processing. Face recognition can also be applied to the first few seconds after a scene change.

In one embodiment, the content of key frames are examined. Key frames are used in video compression as a starting point, with the data of subsequent frames not being recorded, only the difference from the key frame. If the differences become too large, a new key frame is generated. The video decompression then involves recreating all the frames. By examining the key frames, the video does not have to be decompressed. In addition, a key frame may indicate a scene change, depending upon the amount of change that generates a new key frame. Thus, for scene change detection, key frames can also be used, without decompressing.

c. Montage Processing with Markers

Below is an algorithm, according to at least one embodiment, for implementation of a montage, such that WOW markers and FX markers are given highest priority. WOW markers and FX markers are part of a montage in one embodiment. The length of the montage is maximum of (sum of lengths of all WOW/fx media components or 90 seconds). If the WOW/FX markers do not make up for the whole length of montage, the rest of the media is ranked and the processor begins populating the montage with media in the descending order of their scores. The scoring scheme is based on the video level metrics and fragment level metrics. Table 2 below has examples of video level metrics.

TABLE 2

| Video Level Metric | Weight |
| --- | --- |
| Approved for Broadcast | 1000 |
| Approved for Widget | 100 |
| Approved for Digital | 100 |
| Published to Social | 100 |
| Social Shares | 5 |
| Social Likes | 50 |
| Total views | 1 |
| Has title | 30 |
| Num of Comments | 10 |
| Is UGC | 20 |
| Is Controlled User Content | 30 |
| Is Twitter Media | 10 |
| Number of Tags | 10 |
| Faces and Audio Score | 1 |

Table 3 below has examples of fragment level metrics:

TABLE 3

| Fragment Level Metric | Weight |
| --- | --- |
| Thumbnail Marker | 100 |
| Scene Marker with Faces | 20 |
| Audio Marker-Applause | 20 |
| Audio Marker-Singing | 16 |
| Audio Marker-Speech | 12 |
| Audio Marker-Music | 14 |
| Audio Marker-Silence | 0 |

The scores are computed for each fragment. The score for each fragment is computed by adding the video level score and the fragment level score. The fragments are chosen based on WOW markers, FX markers, thumbnail markers, audio markers, or scene markers with faces. Below are some rules to decide the start and end offsets for a fragment:

| Marker | Range |
| --- | --- |
| Point WOW | 5 seconds on either side of point WOW |
| Range WOW | The start and end offsets that user has chosen |
| Slowmotion/Zoom/Spotlight | The start and end offsets as chosen by user/as stored in database |
| Thumbnail Marker | Starts 2 seconds before the thumbnail marker posiiton and ends 3 seconds after the thumbnail position |
| Audio Marker | Mid 5 seconds of the range of Audio Marker |
| Scene Marker with Faces | Scene Marker start offset to 5 seconds from start offset |
| No Marker | Mid 5 seconds of the media |

The program algorithm first chooses all WOW/FX fragments, making sure to merge overlapping fragments. The program then checks for the length of the montage so far. If the montage length exceeds max montage length (e.g., 90 seconds), the program stops populating the montage media components table and proceeds to preparing a montage job and queuing it for montage creation.

If the length hasn't reached 90 seconds yet, the program proceeds to ranking the non-WOW/non FX media fragments. Once ranked, the media components are sorted in the descending order of their scores. The program now begins to populate the montage media components array, adding one fragment after another.

When adding a new fragment, the program checks to see if the new fragment overlaps with existing fragment of same media and merges if the new fragment overlaps, and makes sure to update that fragment score. After adding each fragment, the program computes the montage length, If at any point the length exceeds max montage length, the program stops adding media.

Once the montage has been populated, the media components are ranked based on the new scores. All the WOW/FX fragments are ranked first in the descending order of their scores and then the nonWOW/nonFX in the descending order of their scores.

Figure 16:
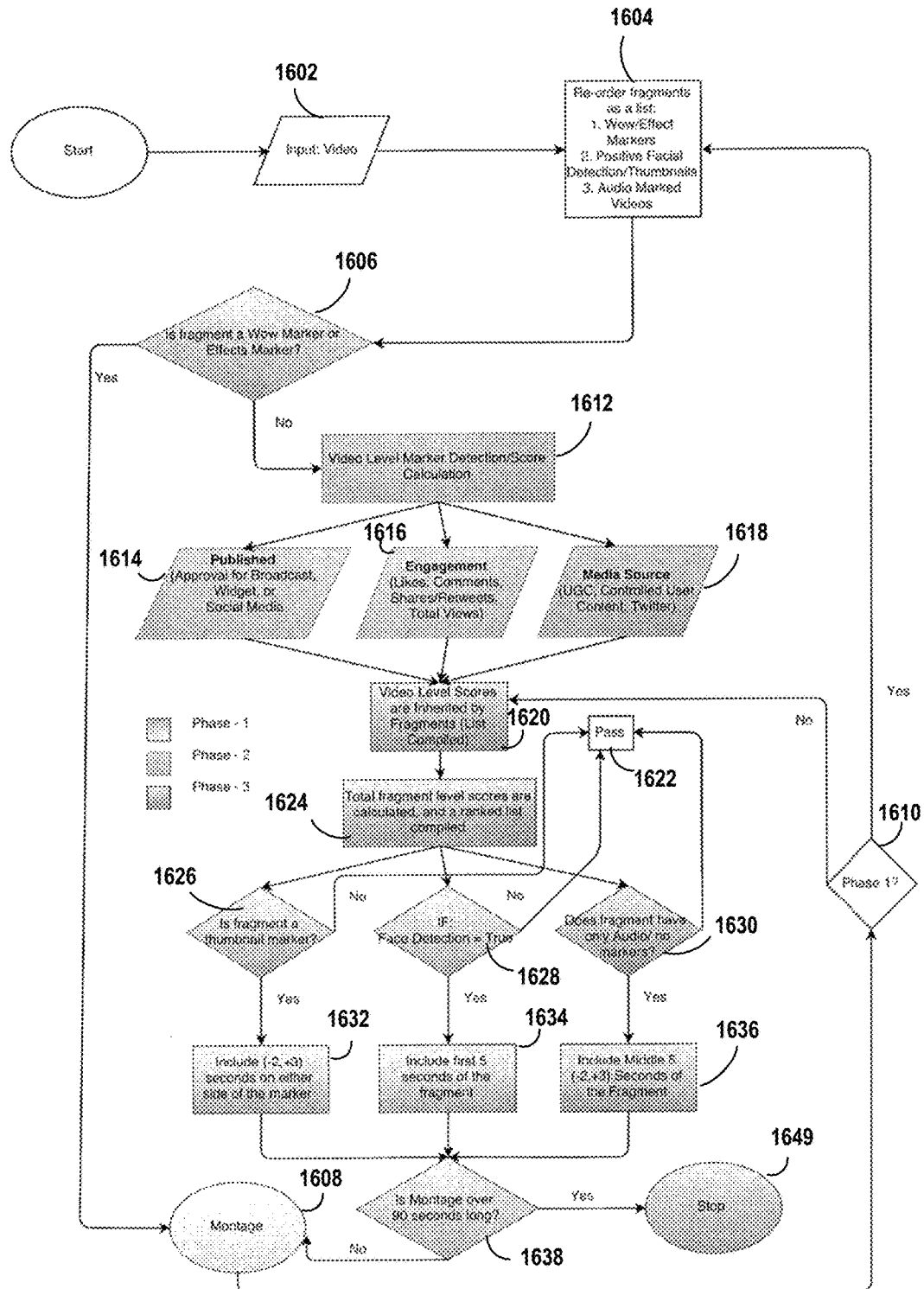
FIG. 16 shows a flowchart of the process flow of montage creation according to an embodiment.

FIG. 16 shows a flowchart of the process flow of montage creation according to an embodiment. Input video 1602 contains markers for particular fragments of the input video. The fragments are reordered as a list (1604) to provide (1) WOW/effect marker fragments, (2) positive facial detection fragments and (3) audio marked videos. Each fragment is examined, in a phase 1 (1606), to determine if it is a WOW or effects marker. If it is, it is added to the montage (1608).

For a simple montage (1610), the process then repeats for the next fragment, and the next video.

For a more complex, advanced montage creation, a video score is calculated (1612). The video (or other media) is examined to see if it has been published (1614), had social engagement (1616) and the media source is determined (1618). The videos are scored, and fragments of that video inherit the score (1620). Alternately, the fragments may themselves be separately scored to decide which fragments from a video to include. The total fragment scores are calculated and ranked (1624). The fragments are then examined in order from the highest to lowest rank, so that if the montage maximum length is reached, the lowest ranking fragments are the ones that are left out. The fragment is examined to determine if it is a thumbnail marker (1626), has a face (1628) or has an audio marker (1630). If it has none, a pass is taken on the fragment (1622), and it is not included in the montage. For thumbnail markers, 2 seconds before the thumbnail and 3 seconds after are included (1632). For faces, the first 5 seconds of the fragment are included (1634). For audio, the middle 5 seconds of the fragment are included (1636). If the montage has reached its maximum (1638), such as 90 seconds, the process stops (1640). Otherwise, the process repeats for the next fragment.

Figure 17:
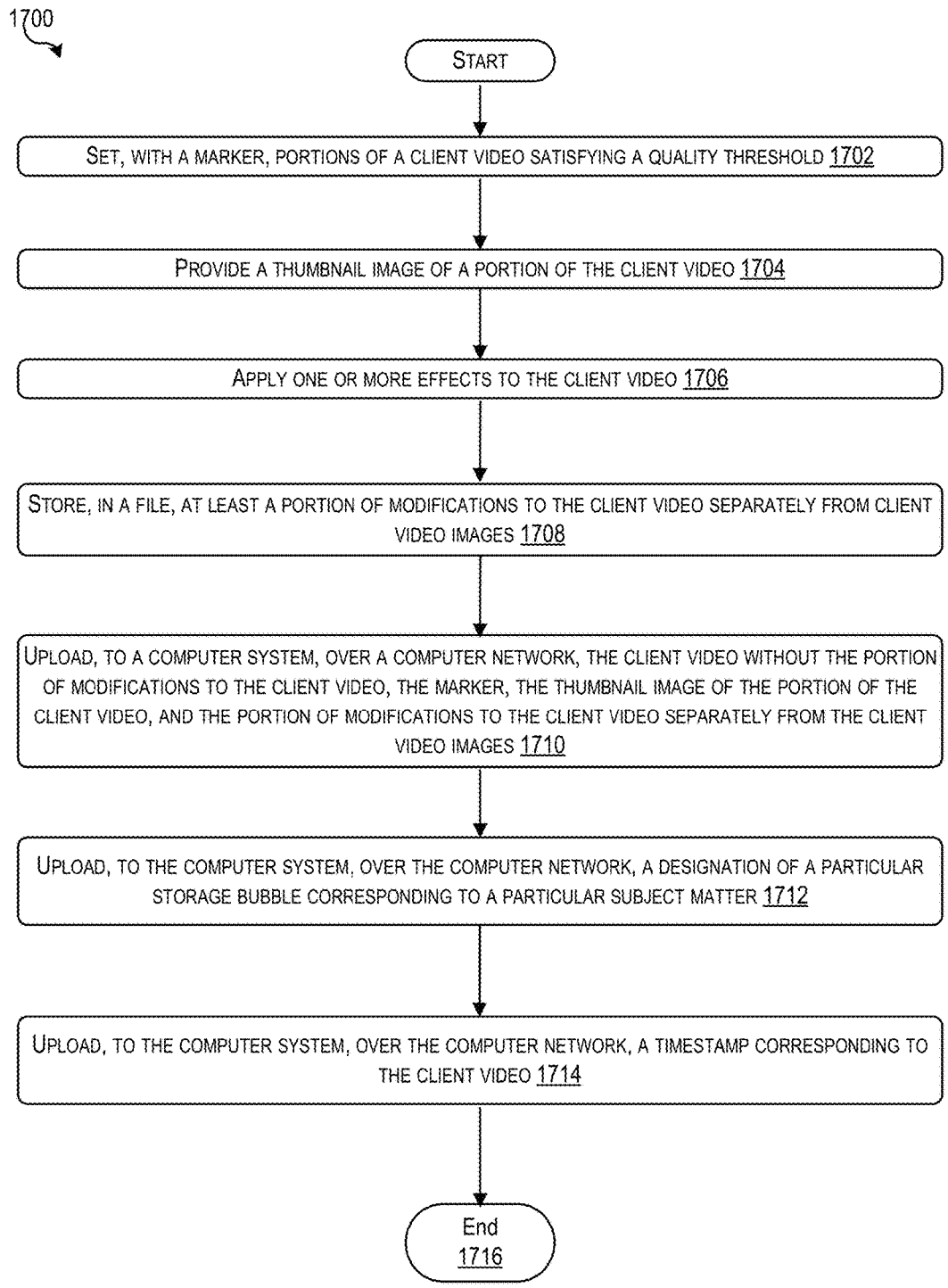
FIGS. 17-19 show flowcharts of process for montage processing according to some embodiments.
Figure 18:
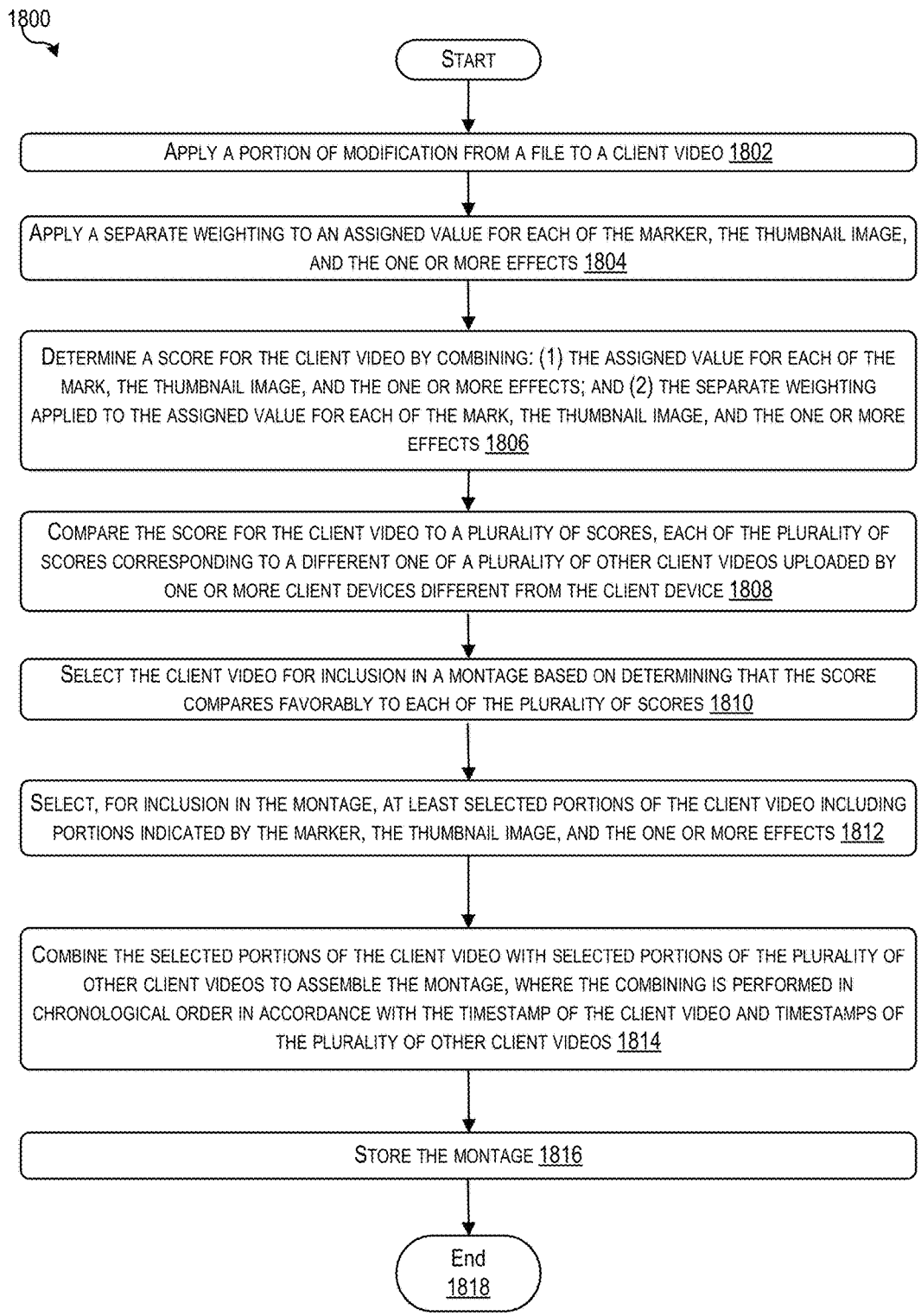
Figure 19:
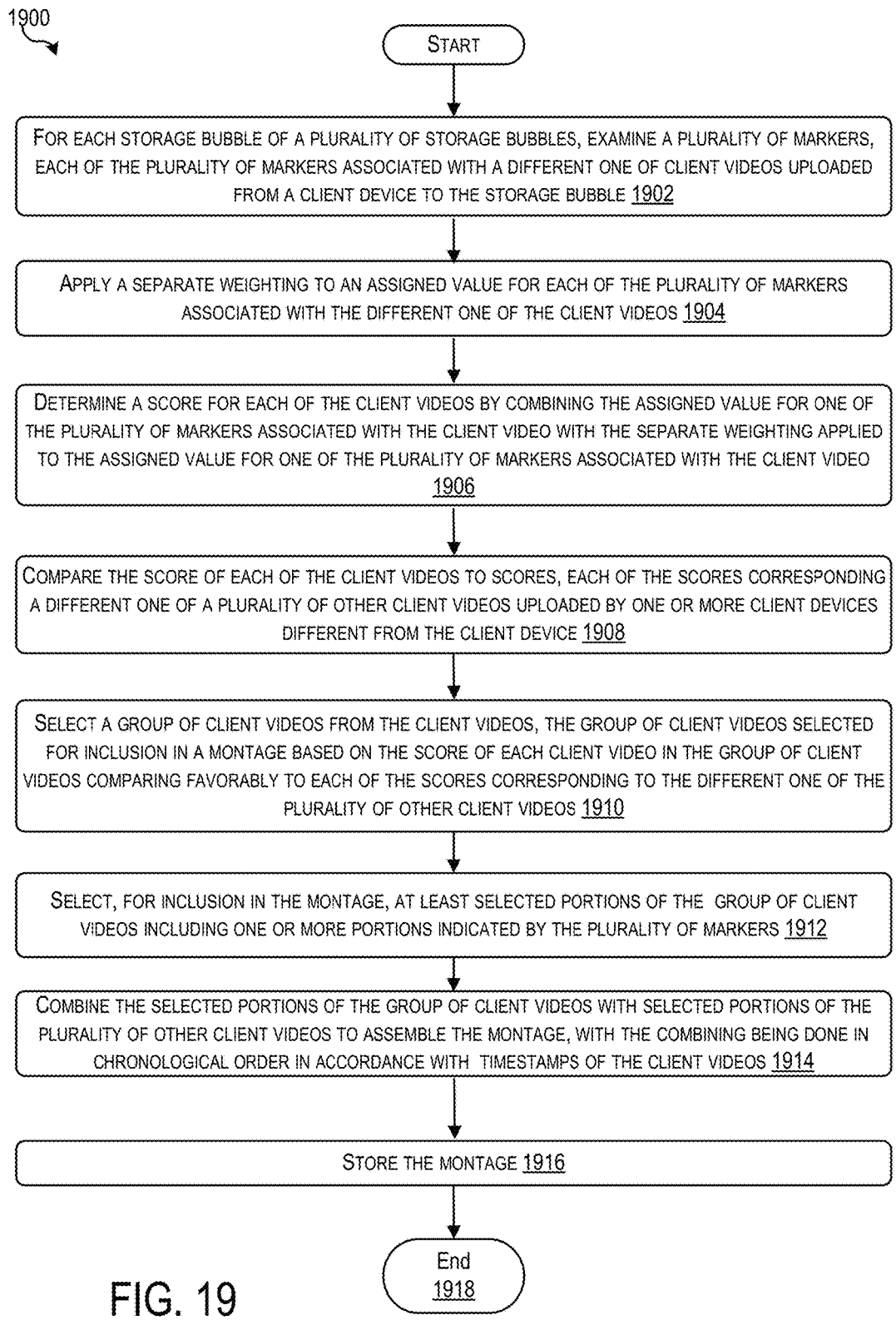

FIGS. 17-19 show flowcharts of process for montage processing according to some embodiments. Each of the blocks in the flowcharts may be implemented by one or more elements described with reference to FIGS. 1-16.

d. Configuring and Providing a Video to a Storage Bubble

FIG. 17 shows a flowchart 1700 of a process for configuring a video and providing the video to a storage bubble. In some embodiments, the process in flowchart 1700 may be implemented by a client system (e.g., a device 116). A video may be configured to be associated with one or more markers, such as a WOW marker (e.g., a marker indicating a goodness of a video), an effects marker, and/or a thumbnail. The operations described with reference to flowchart 1700 may be performed by one or more processors upon execution of one or more computer readable instructions (e.g., first computer readable instructions). The computer readable instructions may be included in code (e.g., program code or computer readable code) (also referred to herein as client code). The code may be loaded (e.g., downloaded) onto the client system. The one or more processors may be included in the client system.

A computer system described in some blocks of flowchart 1700 may be a server computer. The computer system may manage storage bubbles, which are part of a content distribution and communication system 106. The computer system may be part of the content distribution and communication system 106.

Flowchart 1700 may begin at any one of blocks 1702, 1704, or 1706. For example, flowchart 1700 may begin at block 1702 at which one or more portions of a video (e.g., a client video) are set or marked, with a marker (e.g., associated with data). The video may be marked as satisfying a quality threshold. The quality threshold may be defined by one or more attributes.

The quality threshold may be defined as a standard for goodness of the video as disclosed herein. The marker may be set based on one or more instructions (e.g., client instructions) received at a client system.

At block 1704, a portion of a video may be associated with a thumbnail, such as thumbnails disclosed herein. The thumbnail may be an image that is based on or originates from a frame in the video. The thumbnail may be provided (e.g., displayed) at a client system. A thumbnail may be associated with a thumbnail marker indicating a portion of a video for reference. A thumbnail may be provided to a graphical interface as disclosed herein.

At block 1706, one or more effects may be applied to a video. The one or more effects may be applied in response to one or more instructions (e.g., effects instructions) at a client system. One or more effects may be specified using one or more interfaces disclosed herein. The effects may be applied to a video based on input received through an interface.

At block 1708, at least a portion of modifications to a video are stored in a file. A file can be a descriptor file as discussed above. All or some of the modifications to a video may be stored together or separately from video images (e.g., client video images) from the video. The portion of the modification may be stored with location information about the portion. Location information may be a URL of a location in storage of the portion of modifications.

At block 1710, a video may be sent (e.g., uploaded) to a computer system over a computer network. The video may be sent without portion without the portion of modifications to the video, the marker, the thumbnail image of the portion of the video, the portion of modifications to the video separate from the video images.

At block 1712, a designation of a storage bubble may be sent (e.g., uploaded) to a computer system over a computer network. The designation may be data indicating a particular storage bubble. The designation may indicate a subject area. The particular storage bubble may correspond to the subject area. The computer system may be in communication with a database. The database may be part of a content distribution and communication system 106. The database may have a plurality of storage bubbles, each of which may correspond to one or more subject areas. Each storage bubble may be associated with a URL. A computer system of a content distribution and communication system 106 may transmit, over a computer network, a URL of a storage bubble to one or more client systems to enable those client systems to access the URL to upload videos. A client system can submit, using the URL of a particular storage bubble, media content into the particular storage bubble.

At block 1714, a timestamp corresponding to the video may be sent (e.g., uploaded) to a computer system over a computer network. The timestamp may be metadata indicating a time and a date related to capture of the video. Flowchart 1700 may end at block 1716.

e. Automatically Creating a Montage of Videos

FIG. 18 shows a flowchart 1800 of a process for automatically creating a montage of videos. In some embodiments, the process in flowchart 1800 may be implemented by a computer system (e.g., a server computer). The computer system may be part of a content distribution and communication system 106. The computer system may manage storage bubbles, which are part of a content distribution and communication system 106. The computer system may be in communication with a database. The database may be part of a content distribution and communication system 106. The database may have a plurality of storage bubbles, each of which may correspond to one or more subject areas.

The operations described with reference to flowchart 1800 may be performed by one or more processors upon execution of one or more computer readable instructions (e.g., second computer readable instructions). The computer readable instructions may be included in code (e.g., program code or computer readable code) (also referred to herein as server code). The code may be loaded (e.g., downloaded) onto the computer system. The one or more processors may be included in the computer system. All or part of the process described with reference to flowchart 1700 may be implemented before or concurrently with the process described with reference to flowchart 1800.

Flowchart 1800 may begin at block 1802 by applying a portion of modifications from a file to a video. The file may be that which is described with reference to storing in FIG. 17.

The portion of modifications to the video may have been stored with location information of the portion of modifications to the video. In some embodiments, videos may be accessed from a storage bubble. The process described with reference to flowchart 1800 may include transmitting, over a computer network, a URL for a storage bubble to enable a client system to access the URL. Each client system may submit, using the URL of a particular storage bubble, media content into the particular storage bubble.

At block 1804, a separate weighting may be applied to an assigned value for each of a marker, a thumbnail image, and one or more effects of the video. The marker, thumbnail image, and the one or more effects may be configured as described with reference to FIG. 17. A weighting may be applied as disclosed herein.

At block 1806, a score for a video is determined. The score may be determined by combining: (1) the assigned value for each of the mark, the thumbnail image, and the one or more effects; and (2) the separate weighting applied to the assigned value for each of the marker, the thumbnail image, and the one or more effects. A score may be computed based on the techniques disclosed herein.

At block 1808, the score for a video may be compared to a plurality of scores, each of the plurality of scores corresponding to a different one of a plurality of other videos uploaded by one or more client devices different from the client device. At block 1810, the video may be selected for inclusion in a montage based on determining that the score compares favorably to each of the plurality of scores. At block 1812, at least selected portions of the video, including portions indicated by the marker, the thumbnail image, and the one or more effects, may be selected for inclusion in the montage.

At block 1814, the selected portions of the video may be combined with selected portions of the plurality of other videos to assemble the montage, wherein the combining is performed in chronological order in accordance with a timestamp of the video and timestamps of the plurality of other videos. A timestamp for a video may be configured as disclosed herein, such as described with reference to FIG. 17. A timestamp for a video may be uploaded from a client system to a computer system. At block 1816, a montage may be stored.

In some embodiments, the process of flowchart 1800 may include performing operations to assess audio content in a video. The process may include examining audio content associated with a video to detect, in the audio content, at least one of speech, music, singing, or applause. An audio marker may be created for the at least one of the speech, the music, the singing, or the applause detected in the audio content. A separate audio weighting may be applied to an assigned value for at least one of the speech, the music, the singing, or the applause detected in the audio content. An audio score may be produced by combining the assigned value for the at least one of the speech, the music, the singing, or the applause with the separate audio weighting applied to the assigned value for the at least one of the speech, the music, the singing, or the applause. The audio score may be combined with the score for the video. The audio score and/or the combination of the audio score and the score for the video may be used to determine inclusion of the video in a montage.

In some embodiments, the process of flowchart 1800 may include performing operations to assess human faces in a video. The process may include examining a thumbnail image associated with a video to detect a human face. A face marker may be created for the thumbnail image based on detecting the human face. A face weighting may be combined with a score for the video. A combination of the face weighting and the score for the video may be used to determine inclusion of the video in a montage. The face weighting may be determined using techniques disclosed herein for object detection and weighting.

In some embodiments, the process of flowchart 1800 may include performing operations to assess engagement metrics with respect to a video. The process may include recording, in association with the video, engagement metrics from social media engagement metrics. In association with a video, approvals of client media for public distribution may be recorded. One or more weightings may be applied to the engagement metrics and approvals. The score for the video may be combined with the weightings applied to the engagement metrics and the approvals. The engagement metrics can include at least one of a like, a comment, a re-tweet, a view, or a share.

Flowchart 1800 may end at block 1818.

f. Automatically Creating a Montage of Videos

FIG. 19 shows a flowchart 1900 of a process for automatically creating a montage of videos. In some embodiments, the process in flowchart 1900 may be implemented by a computer system (e.g., a server computer). The computer system may be part of a content distribution and communication system 106. The computer system may manage storage bubbles, which are part of a content distribution and communication system 106. The computer system may be in communication with a database. The database may be part of a content distribution and communication system 106. The database may have a plurality of storage bubbles, each of which may correspond to one or more subject areas.

The operations described with reference to flowchart 1900 may be performed by one or more processors upon execution of one or more computer readable instructions. The computer readable instructions may be included in code (e.g., program code or computer readable code) (also referred to herein as server code). The code may be loaded (e.g., downloaded) onto the computer system. The one or more processors may be included in the computer system. All or part of the process described with reference to flowchart 1700 may be implemented before or concurrently with the process described with reference to flowchart 1900. All or part of the process described with reference to flowchart 1900 may be implemented using techniques disclosed with reference to flowchart 1800 of FIG. 18.

Flowchart 1900 may begin at 1902 by examining, for each storage bubble of the plurality of storage bubbles, a plurality of markers, each of the plurality of markers associated with a different one of videos uploaded from a client system to the storage bubble. The plurality of markers may include at least one of: a marker generated in response to one or more client instructions to indicate portions of a video satisfying a quality threshold by the client system; a thumbnail; an effects marker; an audio marker; and a face marker. At block

1904, a separate weighting may be applied to an assigned value for each of the plurality of markers associated with the different one of the videos.

At block 1906, a score may be determined for each of the videos by combining the assigned value for one of the plurality of markers associated with the video with the separate weighting applied to the assigned value for one of the plurality of markers associated with the video. At block 1908, the score of each of the videos may be compared to scores, each of the scores corresponding a different one of a plurality of other videos uploaded by one or more client systems different from the client system.

At block 1910, a group of videos may be selected from the videos, the group of videos selected for inclusion in a montage based on the score of each video in the group of videos comparing favorably to each of the scores corresponding to the different one of the plurality of other videos. At block 1912, for inclusion in the montage, at least selected portions of the group of videos including one or more portions indicated by the plurality of markers may be selected.

At block 1914, the selected portions of the group of videos may be combined with selected portions of the plurality of other videos to assemble the montage. The combining may be performed being performed in chronological order in accordance with timestamps of the videos. In some embodiments, the combining of the selected portions of the group of client videos with selected portions of the plurality of other client videos to assemble the montage includes adding one or more transitions (or "transition effects") to the montage. A transition may include audio, video, an image, or any kind of media that can be perceived by a user. The assembled montage may be created to include transitions and/or transitions may be added to the montage after assembly. A transition may be added according to techniques disclosed herein. A transition may be added based on analyzing the portions of videos included in assembling a montage. A transition may vary between any two portions of media in a montage. The transition based on the type of media for the portions of the media in the montage and/or analysis of the portions of media. A transition may be added based on one or more features with respect to the media in a montage. For example, a transition before or after a portion of media may be based on one or more features of that portion of media.

At block 1916, the montage may be stored.

In some embodiments, the process of flowchart 1900 may include modifying a montage. The process may include modifying the montage to include a first portion of the video with no markers, the first portion corresponding to a first time period of the video. The montage may be modified to include one or more portions of the video before and after the marker. The montage may be modified to include one or more portions of the video before and after a first portion of the video corresponding to the thumbnail.

In some embodiments, the process of flowchart 1900 may include combining the score of a video with a weighting of each of one or more characteristics of frames within the video. A video in a group of videos may include a plurality of key frames, with remaining frames on the video being compressed to indicate differences from each of the plurality of key frames. The process may include examining at least a portion of the plurality of key frames for a set of characteristics. A key frame marker may be provided for each of the plurality of key frames having a characteristic in the set of characteristics. Each of the set of characteristics may be weighted, The weighting of each of the set of characteristics may be combined with the score determined for the video. The score combined with the weightings may be used to determine a montage.

In some embodiments, the process of flowchart 1900 may include techniques for clustering to create a montage. The process may include comparing markers and metadata of a plurality of videos for matching words. The timestamps of the plurality of videos may be compared with each other. The plurality of videos may be grouped into clusters based on the comparing of the timestamps. A video with a highest score may be selected from a plurality of the clusters for inclusion in the montage.

In some embodiments, the process of flowchart 1900 may include techniques for determining an updated score of one or more of the client videos, or portions thereof, which are included in a montage. For each client video, or a portion thereof, included in a montage, a score may be computed. The score may be computed as an update to a previous score for the videos or portions thereof included in a montage. The score of videos in a bubble, including the videos in a montage, may be computed after previously being computed. A score may be computed according to a schedule and/or a change in the video Flowchart 1900 may end at block 1918.

VII. Clustering

In one embodiment, helpful curation assistance can be provided by clustering the videos into groups with similar videos. The clustering can be done without extensive processing and analysis. For example, matching words in the title, comments, tags or other meta data are examined. In addition, using the timestamps, frames at the same time can be examined, with a group of frames chosen at spaced intervals. For the frames examined, the colors and edges within four quadrants of frame may be examined. For each quadrant the intensity of red, green and blue is scored on a scale of 0 to 255, producing a histogram. Alternatively, or in addition, lines (edges) can be examined. The angle at which lines appear inside of a video compared to 180 degrees. The colors and lines are two dimensions in a much larger n-dimensional space in which each video is plotted, with the other dimensions including matching words in the title and comments, etc.

Other possible attributes of the video can be added to the n-dimensional space. Each attribute adds another dimension, and each video is "plotted" in this space based on its specific values for each attribute along each dimension. A clustering algorithm goes through that n-dimensional space and locates where there are clusters (e.g., groups of points closer to each other, and farther from groups of other such points), identifies the centroids of each cluster, and determines the distance between centroids. If there is sufficient distance between two adjacent groups of videos then they are put them into two different clusters or stacks.

In one embodiment, the highest scored video or fragment from each cluster is chosen for a montage. This leads to the most variety in the montage, as each selected video is from a group that is deemed sufficiently dissimilar to the other groups. Alternately, multiple highest scoring videos can be selected if the maximum size of the montage has not been exceeded. In another variation, a human curator can select one of the videos from each cluster. The clustering, in this case, makes the job of the human curator much easier because they do not have to view all videos in the bubble, only the top-scoring few videos in each cluster or stack.

VIII. Object and Condition Labeling

In one embodiment, the videos or photos are examined to detect particular objects or conditions. A convolutional neural network is used to compare the video to a library of thousands of objects and conditions. The objects would include people, cars, boats, buildings, animals, signs, etc. The conditions would include weather (snowing, raining, etc.), nighttime/daytime, inside/outside, etc. The videos and photos are then tagged to indicate the objects and conditions. The videos are fragmented into sample frames, and the sample frames are examined, not all the frames. The frames selected could correspond to a marker or tag.

To decide which labels indicate the video fragment should be incorporated into a montages, an algorithm looks for correlation between the labels and the goodness of the video. This can be done using a linear regression model to score each video based on what those objects are. Certain objects would be scored as more interesting, suggesting a good video. For example, people and animals may score higher than a building or sign. A stage with people on it can be scored higher than an empty stage. In one embodiment, the goodness of a video can be predicted by evaluating the features, objects, audio and other attributes gleaned from a video against a model that is trained on such features taken from a large number of previously approved (good) and rejected (bad) videos.

In one embodiment, the title or other metadata or tags, or the particular bubble the video was uploaded to may indicate a condition. For example, a weather bubble would indicate a weather condition, and a political rally bubble would indicate a political condition.

In one embodiment, a customer or sponsor can specify preferences, and those preferences can be used to select videos. For example, the customer may want beach videos, and the videos can be examined for beach labels.

In one embodiment, a deep learning auto-encoder algorithm is used to look abstract embedded visual features (e.g., colors and edges) in a video and compare them to a library of videos deemed good by curators. Good videos may be ones selected by curators for broadcasting, inclusion in a widget, social media, or other distribution, for example. Alternately, good media can be ones marked with a WOW marker or some other marker.

In another embodiment, an algorithm does action detection and audio similarity detection. The audio is compared to audio deemed good, such as audio for videos deemed good as described above. Action detection combines object detection with determining the type of action from detected motion. Specific types of action are labeled, such as cheering, dancing, running or playing football. The actions can be determined by comparing, with a neural network, to library videos for each type of action.

In one embodiment, one or more criteria or preferences for a montage can be specified (e.g., baseball, concert, touchdown, etc.). Each word or phrase in the criteria is provided to a semantic dictionary engine that identifies all of the related words to the words or phrases provided. That expanded group of words and phrases is then compared to all the words associated with the media—the tags, meta data (e.g., title), bubble names, added labels, etc.

In addition to searching for words, once media satisfying the criteria have been identified, other media can be compared using a neural network, to determine if other media without those words are similar. Another use of this similarity detection is to have a curator identify a particularly good video, and request more videos that are like this one.

While the present disclosure has been described with respect to specific embodiments, one skilled in the art will recognize that numerous modifications are possible. Embodiments of the present disclosure may be realized using a variety of computer systems and communication technologies including but not limited to specific examples described herein.

Embodiments of the present disclosure may be realized using any combination of dedicated components and/or programmable processors and/or other programmable devices. The various processes described herein may be implemented on the same processor or different processors in any combination. Where components are described as being configured to perform certain operations, such configuration may be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the present disclosure has been described with respect to specific embodiments, it will be appreciated that the present disclosure is intended to cover all modifications and equivalents within the scope of the following claims.

What is claimed is:

1. A system comprising:
   a server computer;
   a client device onto which computer readable client code is loaded, including first computer readable instructions which, upon execution by one or more processors, cause the one or more processors to:
   mark, with a marker, in response to one or more client instructions, portions of a client video satisfying a quality threshold by the client device;
   provide a thumbnail image of a portion of the client video indicated by the client device;
   apply one or more effects to the client video in response to one or more effects instructions at the client device;
   store, in a descriptor file, at least a portion of modifications to the client video separately from client video images, wherein the portion of modifications to the client video is stored with location information of the portion of modifications to the client video;
   upload, to the server computer over a computer network, (1) the client video without the portion of modifications to the client video, (2) the marker, (3) the thumbnail image of the portion of the client video, and (4) the portion of modifications to the client video that are separate from the client video images; and
   upload, to the server computer over the computer network, a designation of a particular storage bubble corresponding to a particular subject matter;

upload, to the server computer over the computer network, a timestamp corresponding to the client video; and a database, in communication with the server computer, having a plurality of storage bubbles including the particular storage bubble; and wherein computer readable server code is loaded onto the server computer, including second computer readable instructions which, upon execution by the server computer, cause the server computer to:

apply the portion of modifications from the descriptor file to the client video;

apply a separate weighting to an assigned value for each of the marker, the thumbnail image, and the one or more effects;

determine a score for the client video by combining: (1) the assigned value for each of the marker, the thumbnail image, and the one or more effects; and (2) the separate weighting applied to the assigned value for each of the marker, the thumbnail image, and the one or more effects;

compare the score for the client video to a plurality of scores, each of the plurality of scores corresponding to a different one of a plurality of other client videos uploaded by one or more client devices different from the client device;

select the client video for inclusion in a montage based on determining that the score compares favorably to each of the plurality of scores;

select, for inclusion in the montage, at least selected portions of the client video including portions indicated by the marker, the thumbnail image, and the one or more effects;

combine the selected portions of the client video with selected portions of the plurality of other client videos to assemble the montage, wherein the combining is performed in chronological order in accordance with the timestamp of the client video and timestamps of the plurality of other client videos; and store the montage.

2. The system of claim 1, wherein the designation of the particular storage bubble comprises a uniform resource locator (URL);

wherein the second computer readable instructions, upon execution by the server computer, further cause the server computer to:

transmit the URL over the computer network to enable client devices to access the URL; and wherein the first computer readable instructions, upon execution by the one or more processors, further cause the one or more processors to:

submit, from one or more of the client devices, using the URL of the particular storage bubble, media content into the particular storage bubble.

3. The system of claim 1, wherein the second computer readable instructions, upon execution by the server computer, further cause the server computer to:

examine audio content associated with the client video to detect, in the audio content, at least one of speech, music, singing, or applause;

create an audio marker for the at least one of the speech, the music, the singing, or the applause detected in the audio content;

apply a separate audio weighting to an assigned value for at least one of the speech, the music, the singing, or the applause detected in the audio content;

produce an audio score by combining the assigned value for the at least one of the speech, the music, the singing, or the applause with the separate audio weighting applied to the assigned value for the at least one of the speech, the music, the singing, or the applause; and combine the audio score with the score for the client video.

4. The system of claim 1, wherein the second computer readable instructions, upon execution by the server computer, further cause the server computer to:

examine the thumbnail image associated with the client video to detect a human face;

create a face marker for the thumbnail image based on detecting the human face; and combine a face weighting with the score for the client video.

5. The system of claim 1, wherein the second computer readable instructions, upon execution by the server computer, further cause the server computer to:

record, in association with the client video, engagement metrics from social media engagement metrics;

record, in association with the client video, approvals of client media for public distribution;

apply one or more weightings to the engagement metrics and approvals; and combine the score for the client video with the weightings applied to the engagement metrics and the approvals.

6. The system of claim 5, wherein the engagement metrics include at least one of a like, a comment, a re-tweet, a view, or a share.

7. A computer-implemented method comprising, by a server computer:

applying, to client video, a portion of modifications uploaded from a client device, the portion of modifications to the client video being stored with location information of the portion of modifications to the client video;

applying a separate weighting to an assigned value for each of a first marker, a thumbnail image of a portion of the client video indicated by the client device, and one or more effects to the client video, wherein the first marker is marked for portions of the client video satisfying a quality threshold, and wherein the one or more effects are applied in response to one or more effects instructions at the client device;

determining a score for the client video by combining: (1) the assigned value for each of the first mark, the thumbnail image, and the one or more effects; and (2) the separate weighting applied to the assigned value for each of the first mark, the thumbnail image, and the one or more effects;

comparing the score for the client video to a plurality of scores, each of the plurality of scores corresponding to a different one of a plurality of other client videos uploaded by one or more client devices different from the client device;

selecting the client video for inclusion in a montage based on determining that the score compares favorably to each of the plurality of scores;

selecting, for inclusion in the montage, at least selected portions of the client video including portions indicated by the first marker, the thumbnail image, and the one or more effects;

combining the selected portions of the client video with selected portions of the plurality of other client videos to assemble the montage, wherein the combining is done in chronological order in accordance with a timestamp of the client video and timestamps of the plurality of other client videos, wherein the timestamp of the client video is uploaded to the server computer; and storing the montage.

8. The computer-implemented method of claim 7, wherein the client device uploads a designation of a particular storage bubble corresponding to a particular subject matter, wherein the designation of the particular storage bubble comprises a uniform resource locator (URL), and wherein the method further comprises:

transmitting the URL over a computer network to enable client devices to access the URL; and receiving, from one or more of the client devices, based on the URL of the particular storage bubble, media content for the particular storage bubble.

9. The computer-implemented method of claim 7, further comprising:

examining audio content associated with the client video to detect, in the audio content, at least one of speech, music, singing, or applause;

creating an audio marker for the at least one of the speech, the music, the singing, or the applause detected in the audio content;

applying a separate audio weighting to an assigned value for at least one of the speech, the music, the singing, or the applause detected in the audio content;

producing an audio score by combining the assigned value for the at least one of the speech, the music, the singing, or the applause with the separate audio weighting applied to the assigned value for the at least one of the speech, the music, the singing, or the applause; and combining the audio score with the score for the client video.

10. The computer-implemented method of claim 7, further comprising:

examining the thumbnail image associated with the client video to detect a human face;

creating a face marker for the thumbnail image based on detecting the human face; and combining a face weighting with the score for the client video.

11. The computer-implemented method of claim 7, further comprising:

recording, in association with the client video, engagement metrics from social media engagement metrics;

recording, in association with the client video, approvals of client media for public distribution;

applying one or more weightings to the engagement metrics and approvals; and combining the score for the client video with the weightings applied to the engagement metrics and the approvals.

12. The computer-implemented method of claim 11, wherein the engagement metrics include at least one of a like, a comment, a re-tweet, a view, or a share.

13. A system comprising:

a server computer; and a database, in communication with the server computer, having a plurality of storage bubbles; and wherein computer readable server code is loaded onto the server computer, including computer readable instructions which, upon execution by the server computer, cause the server computer to:

for each storage bubble of the plurality of storage bubbles, examine a plurality of markers, each of the plurality of markers associated with a different one of client videos uploaded from a client device to the storage bubble;

apply a separate weighting to an assigned value for each of the plurality of markers associated with the different one of the client videos;

determine a score for each of the client videos by combining the assigned value for one of the plurality of markers associated with the client video with the separate weighting applied to the assigned value for one of the plurality of markers associated with the client video;

compare the score of each of the client videos to scores, each of the scores corresponding a different one of a plurality of other client videos uploaded by one or more client devices different from the client device;

select a group of client videos from the client videos, the group of client videos selected for inclusion in a montage based on the score of each of the client videos in the group of client videos comparing favorably to each of the scores corresponding to the different one of the plurality of other client videos;

select, for inclusion in the montage, at least selected portions of the group of client videos including one or more portions indicated by the plurality of markers;

combine the selected portions of the group of client videos with selected portions of the plurality of other client videos to assemble the montage, with the combining being performed in chronological order in accordance with timestamps of the client videos; and store the montage.

14. The system of claim 13 wherein the plurality of markers include at least one of:

a marker generated in response to one or more client instructions to indicate portions of a client video satisfying a quality threshold by the client device;

a thumbnail;

an effects marker;

an audio marker; and a face marker.

15. The system of claim 14 wherein the computer readable instructions, upon execution by the server computer, further cause the server computer to:

modify the montage to include a first portion of the client video with no markers, the first portion corresponding to a first time period of the client video;

modify the montage to include one or more portions of the client video before and after the marker; and modify the montage to include one or more portions of the client video before and after a first portion of the client video corresponding to the thumbnail.

16. The system of claim 13 wherein a client video in the group of client videos includes a plurality of key frames, with remaining frames on the client video being compressed to indicate differences from each of the plurality of key frames, and wherein the computer readable instructions, upon execution by the server computer, further cause the server computer to:

examine at least a portion of the plurality of key frames for a set of characteristics;

provide a key frame marker for each of the plurality of key frames having a characteristic in the set of characteristics;

weighting each of the set of characteristics; and combining the weighting of each of the set of characteristics with the score determined for the client video.

17. The system of claim 13 wherein the computer readable instructions, upon execution by the server computer, further cause the server computer to:
compare markers and metadata of a plurality of client videos for matching words;
comparing the timestamps of the plurality of client videos;
grouping the plurality of client videos into clusters based on the comparing; and
selecting a client video with a highest score from a plurality of the clusters for inclusion in the montage.

18. The system of claim 13, wherein the computer readable instructions, upon execution by the server computer, further cause the server computer to:
determine an updated score for one or more of the client videos;
compare the updated score of the one or more of the client videos to the scores;
select a updated group of client videos from the client videos based on comparing the updated score of the one or more of the client videos to the scores, wherein the updated group of client videos selected for inclusion in an updated montage that is updated from the montage, and wherein the updated group of client videos is selected based on the updated score of the one or more of the client videos in the updated group of client videos; and
generate the updated montage by combining the updated group of client videos.

19. The system of claim 18, wherein the updated score for the one or more of the client videos is determined based on detecting an update to the one of the plurality of markers associated with the one or more of the client videos.

20. The system of claim 13, wherein combining the selected portions of the group of client videos with selected portions of the plurality of other client videos to assemble the montage includes adding one or more transition effects to the montage.

* * * * *